US012689621B2

(12) United States Patent
Ramshaw et al.

(10) Patent No.: US 12,689,621 B2
(45) Date of Patent: Jul. 21, 2026

(54) SECURE EDGE SYSTEM

(71) Applicant: Schlumberger Technology Corporation, Sugar Land, TX (US)

(72) Inventors: Sylvain Ramshaw, Houston, TX (US); Maria Krovatkina, Houston, TX (US); Anh Dang, Houston, TX (US); Colin Stewart, Houston, TX (US); Bruno Augusto Branco Mazetti, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 319 days.

(21) Appl. No.: 18/692,468

(22) PCT Filed: Oct. 5, 2022

(86) PCT No.: PCT/US2022/045749
§ 371 (c)(1),
(2) Date: Mar. 15, 2024

(87) PCT Pub. No.: WO2023/059696
PCT Pub. Date: Apr. 13, 2023

(65) Prior Publication Data
US 2025/0126111 A1 Apr. 17, 2025

Related U.S. Application Data

(60) Provisional application No. 63/254,142, filed on Oct. 10, 2021.

(51) Int. Cl.
*H04L 9/40* (2022.01)
*G06N 20/00* (2019.01)
(Continued)

(52) U.S. Cl.
CPC ........... *H04L 63/083* (2013.01); *G06N 20/00* (2019.01); *G06T 19/006* (2013.01);
(Continued)

(58) Field of Classification Search
None
See application file for complete search history.

(56) References Cited

U.S. PATENT DOCUMENTS

| | | | |
|---|---|---|---|
| 5,132,904 A | 7/1992 | Lamp | |
| 2009/0168606 A1 | 7/2009 | Lerche | |

(Continued)

FOREIGN PATENT DOCUMENTS

WO 2020027861 A1 2/2020

OTHER PUBLICATIONS

Search Report and Written Opinion of International Patent Application No. PCT/US2022/045749; Dated Jan. 31, 2023; 11 pages.

*Primary Examiner* — Michael J Cobb
(74) *Attorney, Agent, or Firm* — Kyle R. Miiller

(57) ABSTRACT
A system can include edge devices that include communication circuitry; and one or more security components. A method can include receiving security codes from a plurality of edge devices without accessing the Internet: comparing the security codes without accessing the Internet; and, based at least in part on the comparing, connecting the plurality of edge devices for communication without accessing the Internet. A method can include executing a trained machine learning model on an edge device; and, based at least in part on the executing, detecting a change in state of the edge device.

13 Claims, 22 Drawing Sheets

(51) Int. Cl.

| | |
|---|---|
| *G06T 19/00* | (2011.01) |
| *H04L 9/32* | (2006.01) |
| *H04W 12/122* | (2021.01) |
| *H04W 12/50* | (2021.01) |

(52) U.S. Cl.
CPC .............. *H04L 9/3247* (2013.01); *H04L 9/40* (2022.05); *H04L 63/0853* (2013.01); *H04W 12/122* (2021.01); *H04W 12/50* (2021.01)

(56) References Cited

U.S. PATENT DOCUMENTS

| | | | | |
|---|---|---|---|---|
| 2018/0077200 | A1 | 3/2018 | Apvrille | |
| 2019/0222596 | A1 | 7/2019 | Abbaszadeh | |
| 2019/0320317 | A1* | 10/2019 | Sakai | ............... H04W 12/0431 |
| 2019/0340605 | A1* | 11/2019 | Lewis | .................. H04W 12/79 |
| 2020/0371262 | A1 | 11/2020 | McClure | |
| 2020/0401696 | A1* | 12/2020 | Ringlein | ................. G06N 3/08 |
| 2021/0142515 | A1 | 5/2021 | Luu | |
| 2021/0216618 | A1* | 7/2021 | Krejci | .................. H04L 9/3271 |
| 2021/0374021 | A1* | 12/2021 | Santhakumar | .......... G06F 3/067 |
| 2025/0293884 | A1* | 9/2025 | Gilchrist | .............. G06F 3/0655 |

* cited by examiner

System 100

Slant Hole 372

S-shaped Hole 374

Deep Inclined Hole 376

Horizontal Hole 378

System 600

System 700
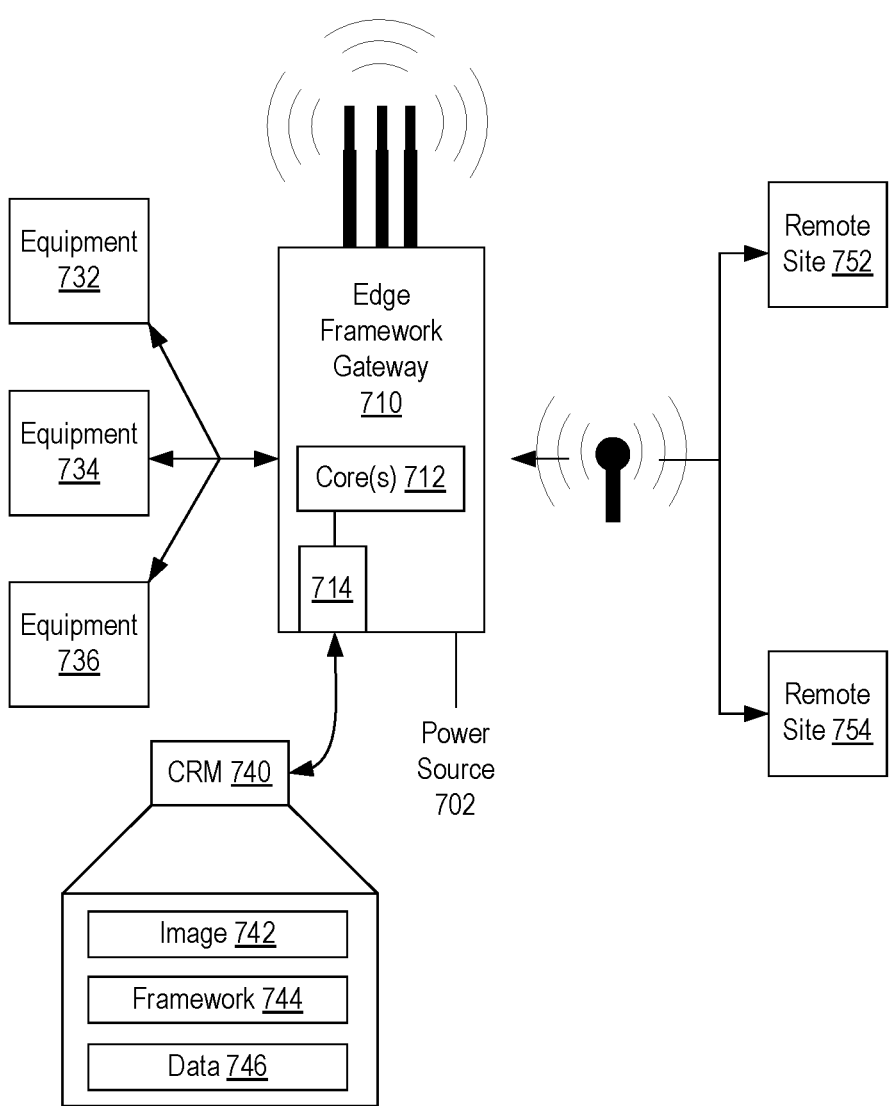
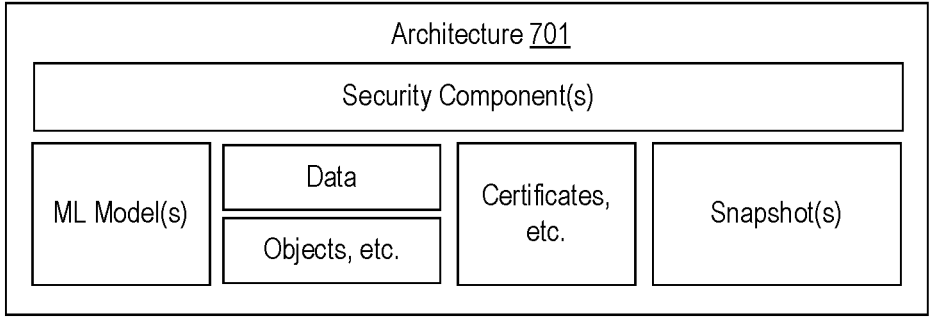
Fig. 7

System 800
Code 810
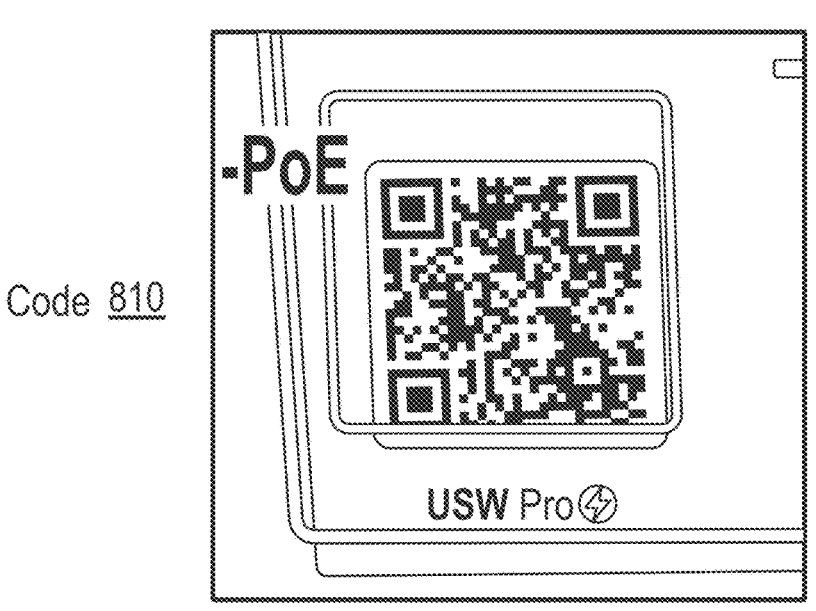
AR 830
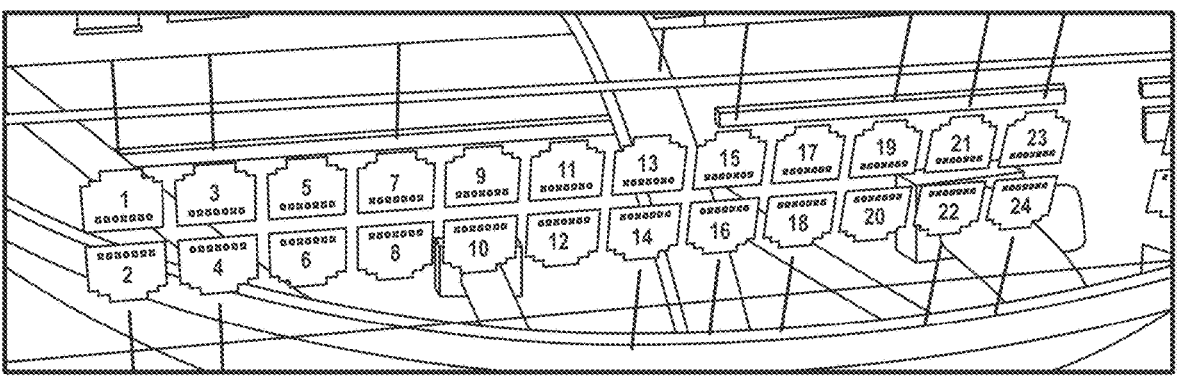
FIG. 8

System 900
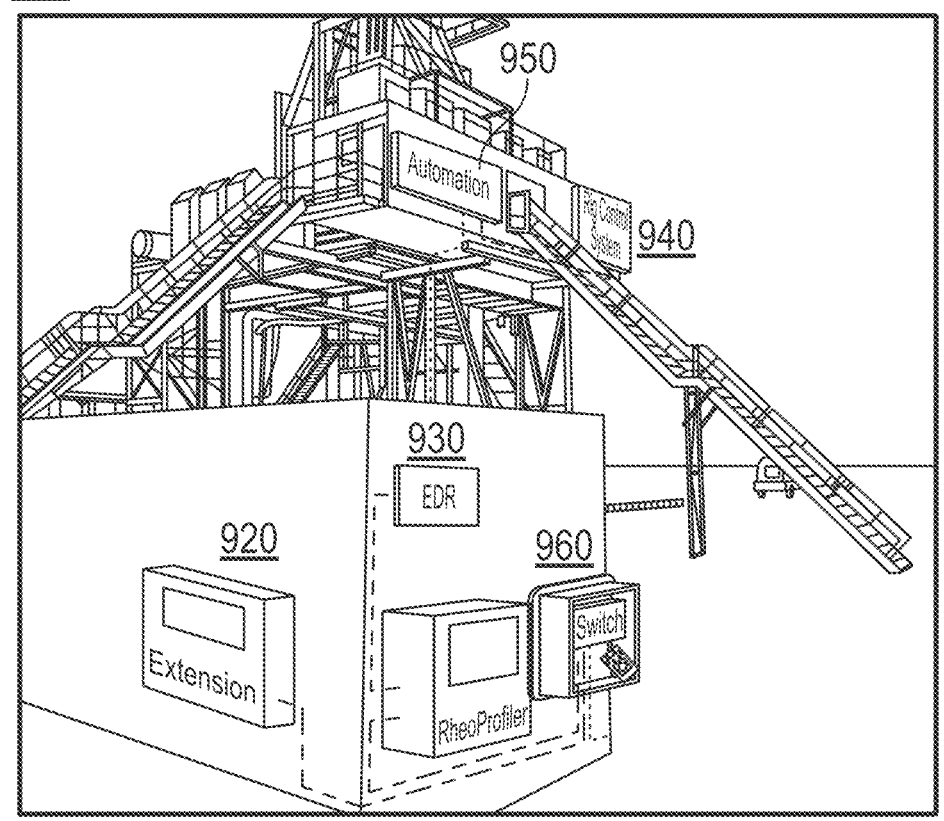
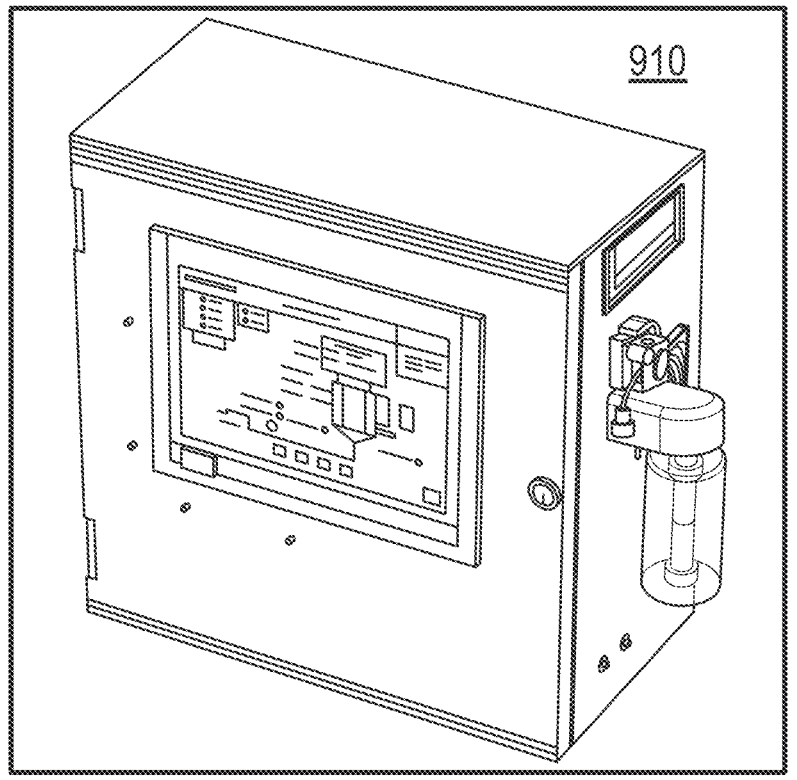
FIG. 9

Code <u>1010</u>
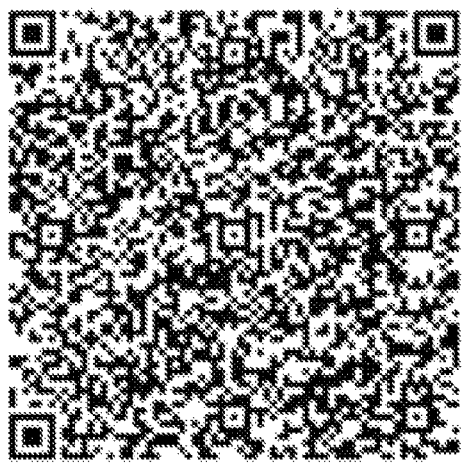
Code <u>1030</u>
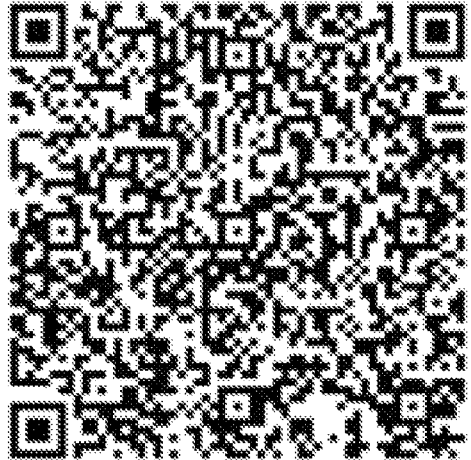
Fig. 10

Graphic <u>1100</u>

System 1300

Streamlined pairing process

| 1 | RheoProfiler display |
|---|---|
| | Thumbprint for the Public Certificate |
| ? | a031c46782e6e6c662c2c87c76da9aa62ccabd8e |
| ? | f21c4676cdb6b2e16f0f9419cd9aa62ccab2d7 |
| ? | 6f09f9419cdff328437b2d7a031c46782e6e6c66 |

| 2 | Extension module display |
|---|---|
| | Thumbprint for the Public Certificate |
| ? | a031c46782e6e6c662c2c87c76da9aa62ccabd8e |
| ○ | f21c4676cdb6b2e16f0f9419cd9aa62ccab2d7 |
| ? | 6f09f9419cdff328437b2d7a031c46782e6e6c66 |

| 3 | DrillOps Automation display |
|---|---|
| | Thumbprint for the Public Certificate |
| ? | a031c46782e6e6c662c2c87c76da9aa62ccabd8e |
| ? | f21c4676cdb6b2e16f0f9419cd9aa62ccab2d7 |
| △ | 6f09f9419cdff328437b2d7a031c46782e6e6c66 |

? = received but not trusted yet

FIG. 13

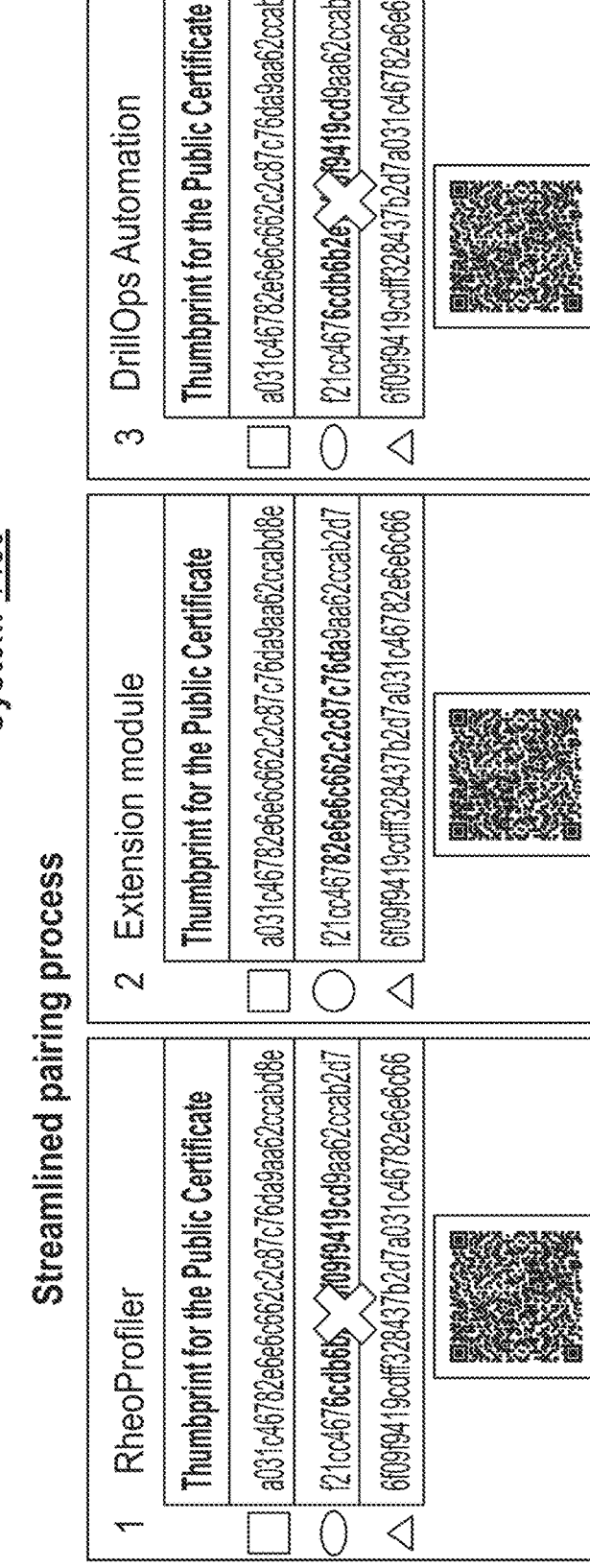
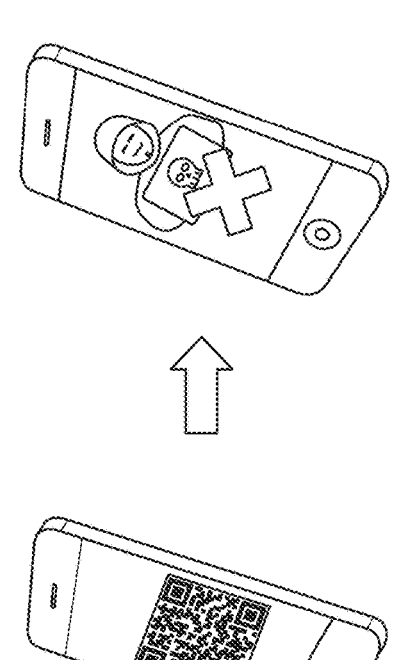
FIG. 14

EDGE SECURITY

HIGH FIDELITY ALERTS

LOW BANDWIDTH

OFFLINE

Machine Learning

System Posture monitoring

System 1900

2004

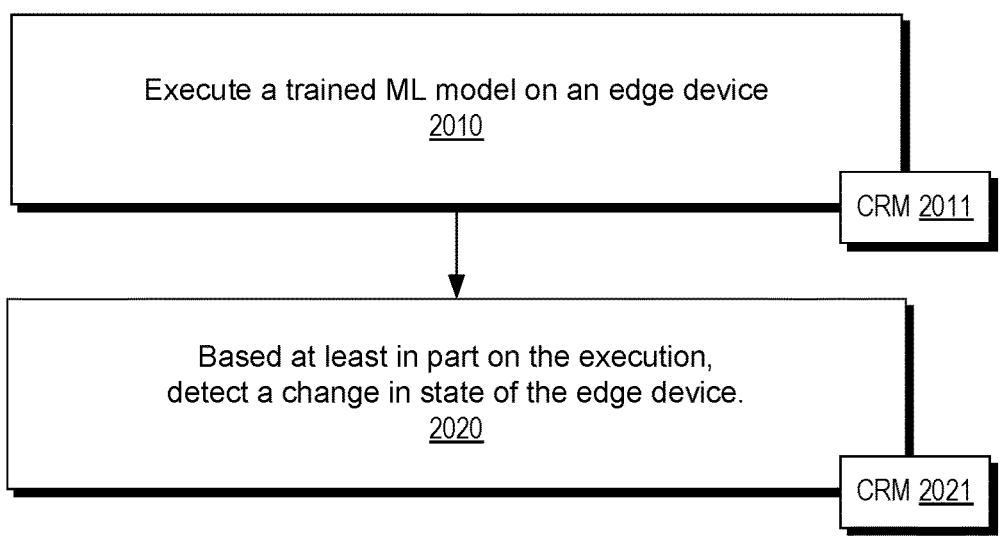

Execute a trained ML model on an edge device
2010

CRM 2011

Based at least in part on the execution,
detect a change in state of the edge device.
2020

CRM 2021

2008

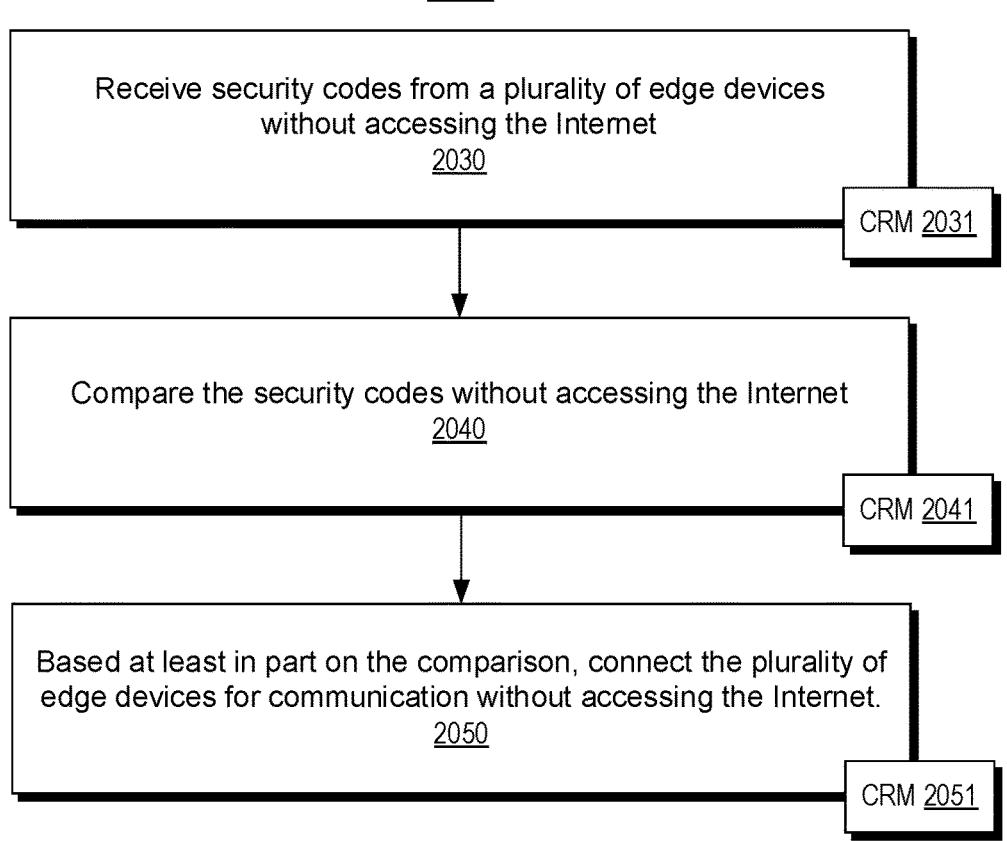

Receive security codes from a plurality of edge devices
without accessing the Internet
2030

CRM 2031

Compare the security codes without accessing the Internet
2040

CRM 2041

Based at least in part on the comparison, connect the plurality of
edge devices for communication without accessing the Internet.
2050

CRM 2051

Fig. 20

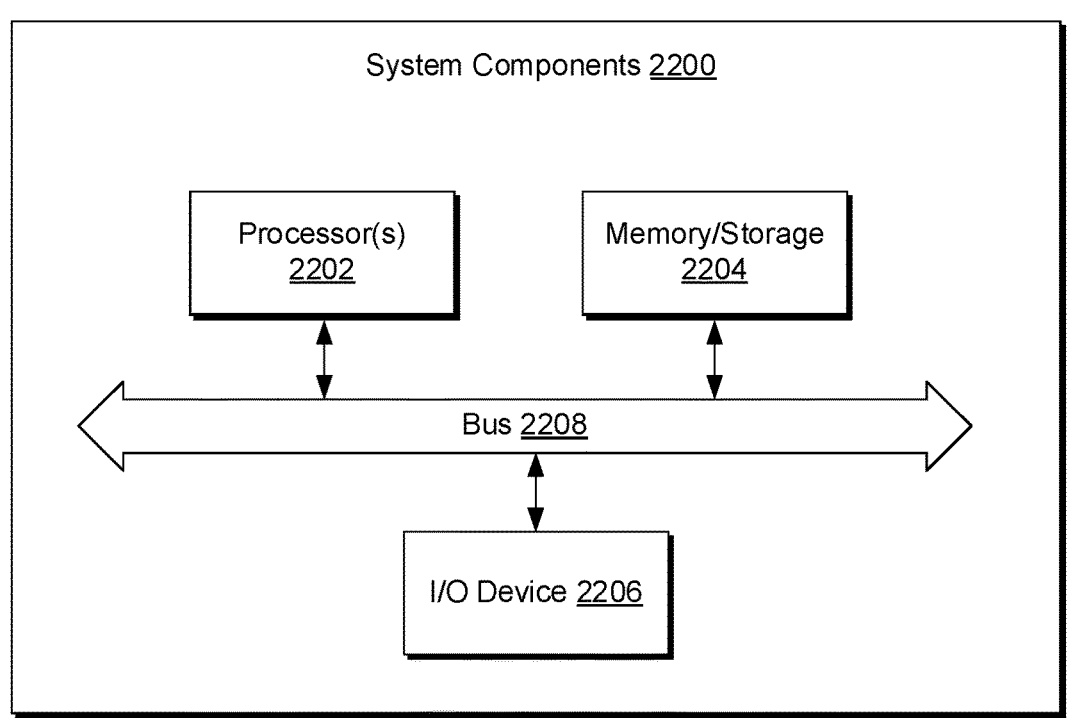
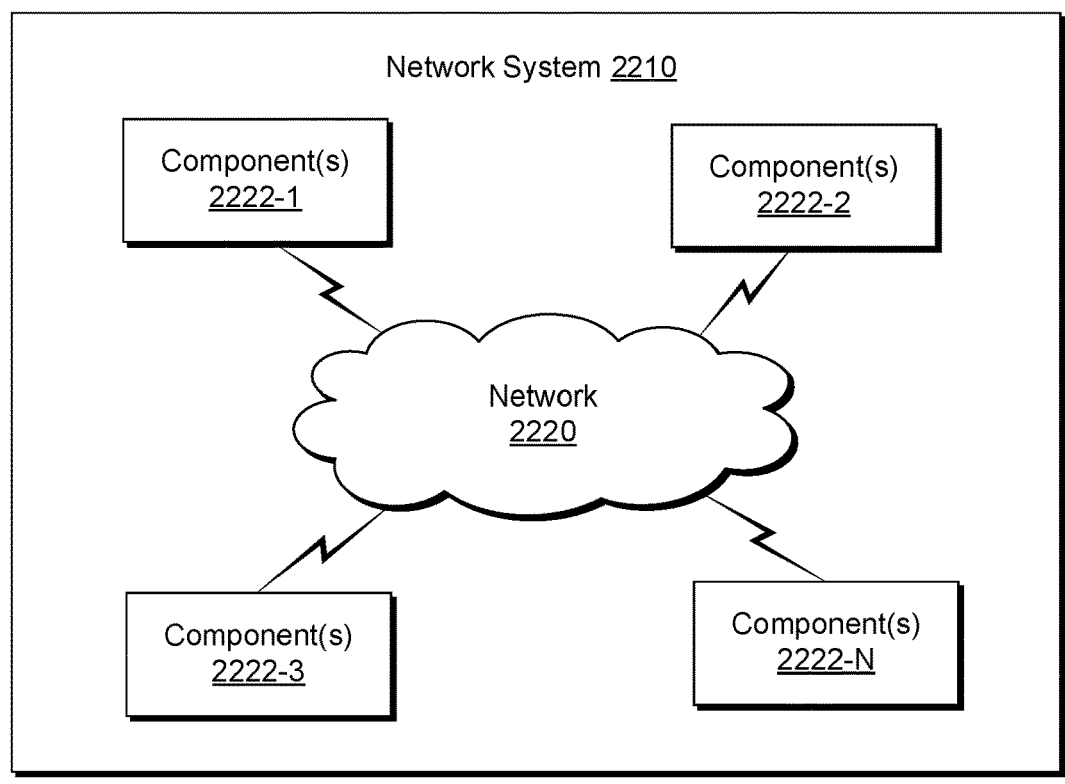
Fig. 22

SECURE EDGE SYSTEM

CROSS-REFERENCE TO RELATED APPLICATION(S)

The subject disclosure is a National Stage Entry of International Application No. PCT/US2022/045749, filed Oct. 5, 2022, which claims priority from U.S. Provisional Appl. No. 63/254,142, filed on Oct. 10, 2021, herein incorporated by reference in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc., where fluid may be produced via the borehole (e.g., as a completed well, etc.). As an example, one or more workflows may be performed using one or more computational frameworks and/or one or more pieces of equipment that include features for one or more of analysis, acquisition, model building, control, etc., for exploration, interpretation, drilling, fracturing, production, etc.

SUMMARY

A system can include edge devices that include communication circuitry; and one or more security components. A method can include receiving security codes from a plurality of edge devices without accessing the Internet; comparing the security codes without accessing the Internet; and, based at least in part on the comparing, connecting the plurality of edge devices for communication without accessing the Internet. A method can include executing a trained machine learning model on an edge device; and, based at least in part on the executing, detecting a change in state of the edge device. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 7 illustrates an example of a system;

FIG. 8 illustrates an example of a system;

FIG. 9 illustrates an example of a system;

FIG. 10 illustrates examples of graphical codes;

FIG. 13 illustrates an example of a system;

FIG. 14 illustrates an example of a system;

FIG. 20 illustrates an example of a method;

FIG. 22 illustrates example components of a system and a networked system.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
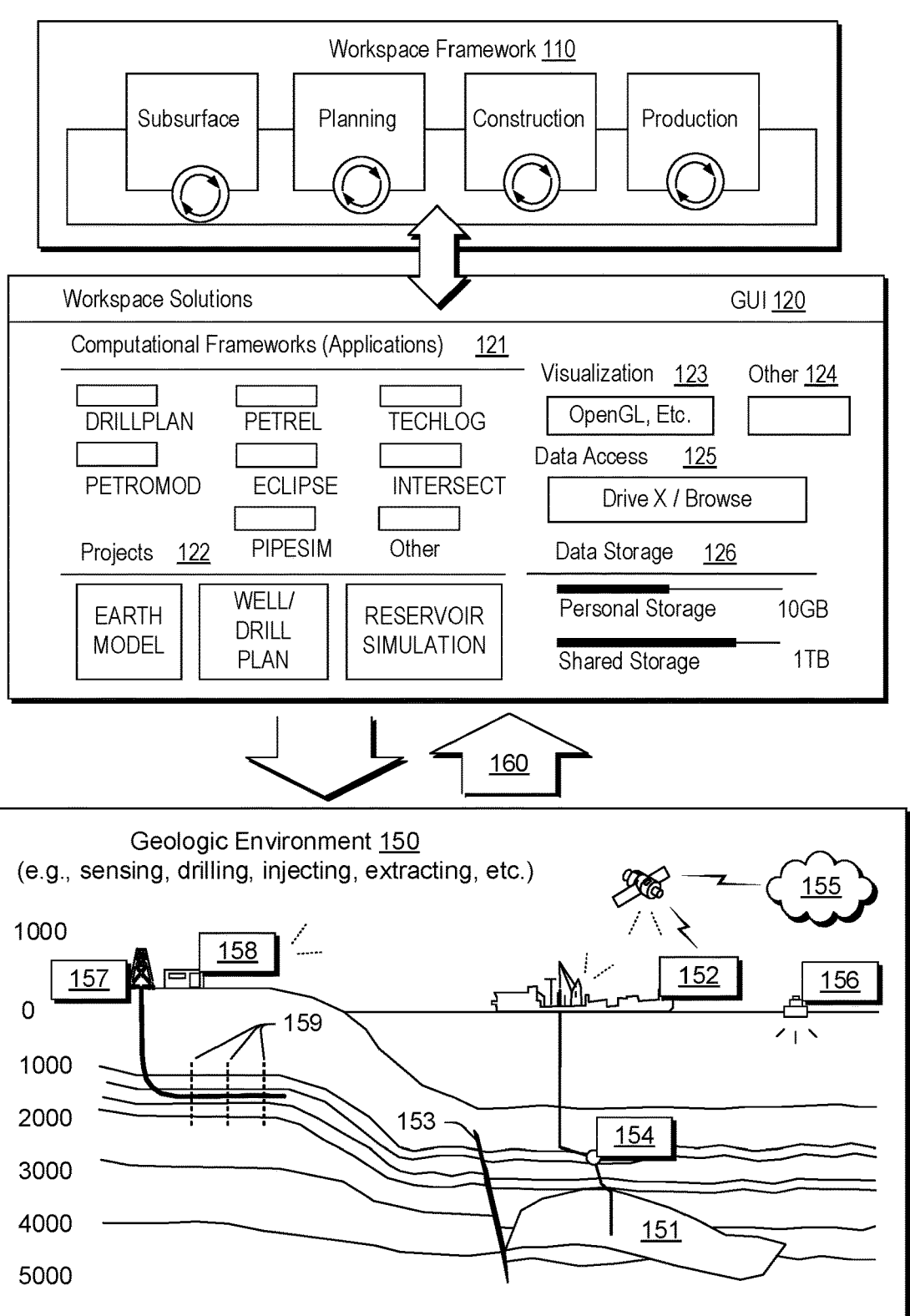
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, PIPESIM, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent, and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PIPESIM network simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, caprock and fault-seal integrity in a geologic environment, fracture behavior in a geologic environment, thermal recovery in a geologic environment, $CO_2$ disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework (Schlumberger Limited, Houston, Texas).

As an example, a workflow may utilize one or more types of data for one or more processes (e.g., stratigraphic modeling, basin modeling, completion designs, drilling, production, injection, etc.). As an example, one or more tools may provide data that can be used in a workflow or workflows that may implement one or more frameworks (e.g., PETREL, TECHLOG, PETROMOD, ECLIPSE, etc.).

Figure 2:
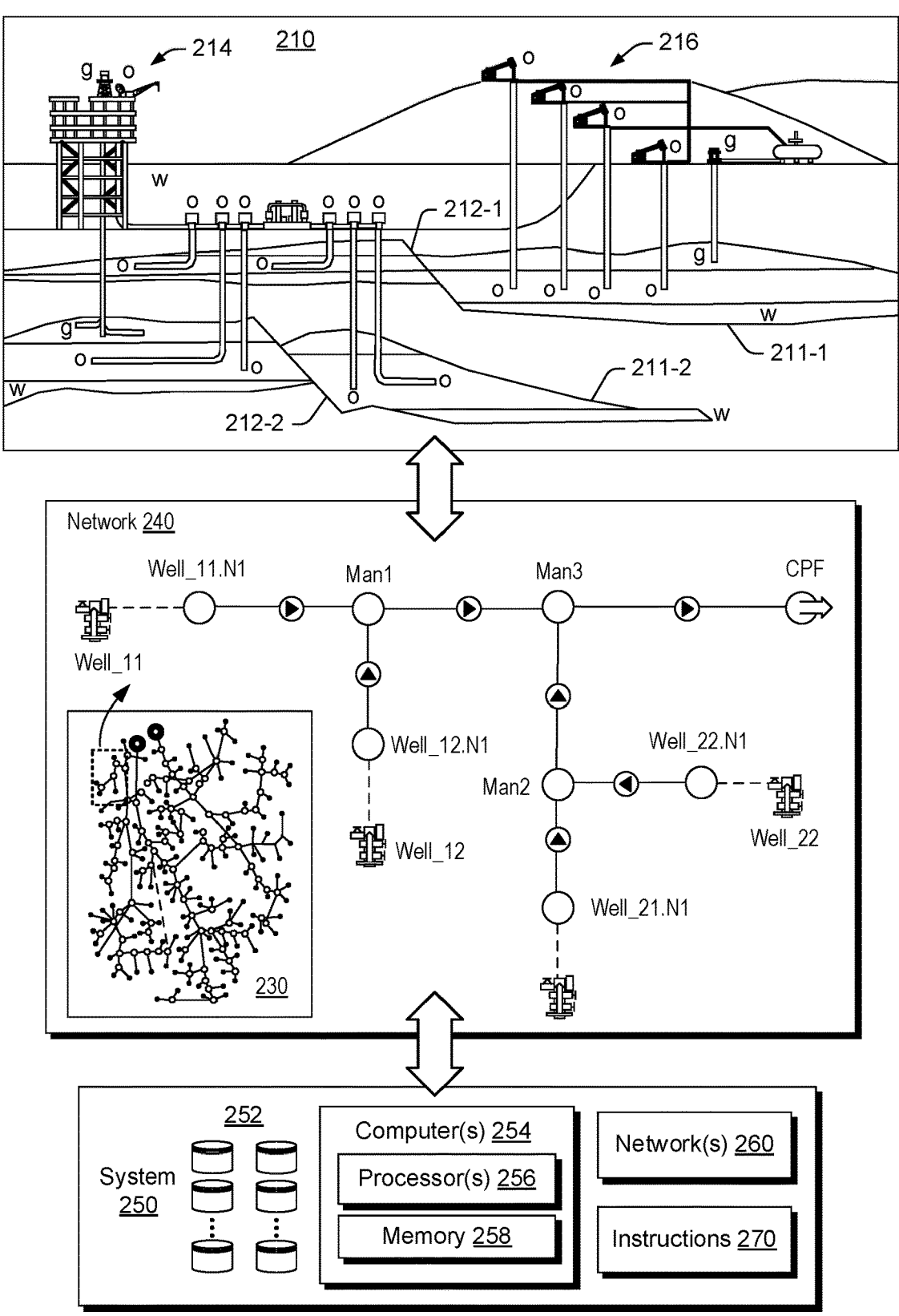
FIG. 2 illustrates examples of systems.

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1.

In the example of FIG. 2, the various equipment 214 and 216 can include drilling equipment, wireline equipment, production equipment, etc. For example, consider the equipment 214 as including a drilling rig that can drill into a formation to reach a reservoir target where a well can be completed for production of hydrocarbons. In such an example, one or more features of the system 100 of FIG. 1 may be utilized. For example, consider utilizing the DRILLPLAN framework to plan, execute, etc., one or more drilling operations.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of oil and gas fluids from well locations along flowlines interconnected at junctions with final delivery at a central processing facility.

In the example of FIG. 2, various portions of the network 240 may include conduit. For example, consider a perspective view of a geologic environment that includes two conduits which may be a conduit to Man1 and a conduit to Man3 in the network 240.

As shown in FIG. 2, the example system 250 includes one or more information storage devices 252, one or more computers 254, one or more networks 260 and instructions 270 (e.g., organized as one or more sets of instructions). As to the one or more computers 254, each computer may include one or more processors (e.g., or processing cores) 256 and memory 258 for storing the instructions 270 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, information that may be stored in one or more of the storage devices 252 may include information about equipment, location of equipment, orientation of equipment, fluid characteristics, etc.

As an example, the instructions 270 can include instructions (e.g., stored in the memory 258) executable by at least one of the one or more processors 256 to instruct the system 250 to perform various actions. As an example, the system 250 may be configured such that the instructions 270 provide for establishing a framework, for example, that can perform network modeling (see, e.g., the PIPESIM framework of the example of FIG. 1, etc.). As an example, one or more methods, techniques, etc. may be performed using one or more sets of instructions, which may be, for example, the instructions 270 of FIG. 2.

Figure 3:
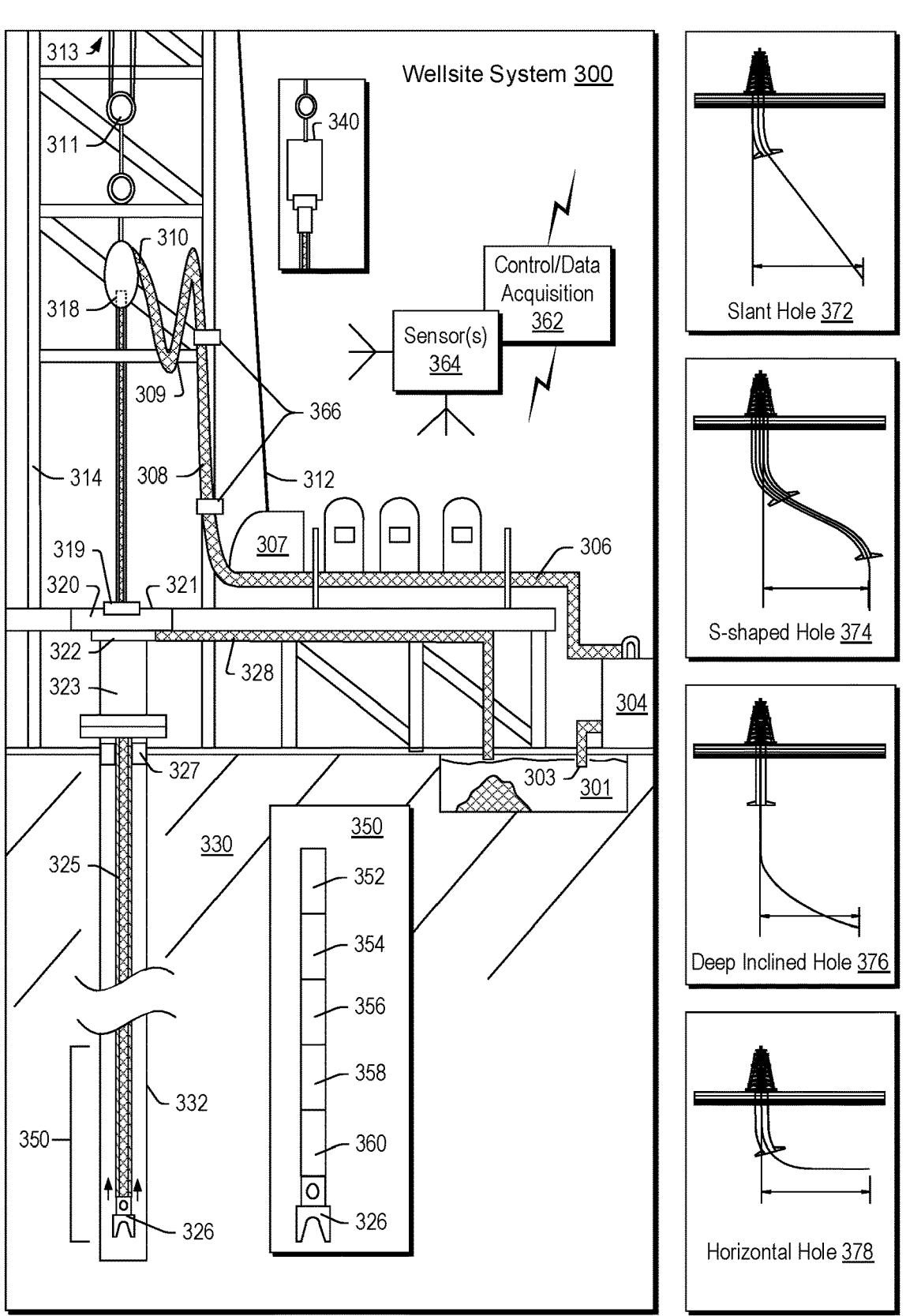
FIG. 3 illustrates an example of a system.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud (e.g., and cuttings) may be returned to the mud tank 301, for example, for recirculation (e.g., with processing to remove cuttings, etc.).

The mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulate. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 354 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 4:
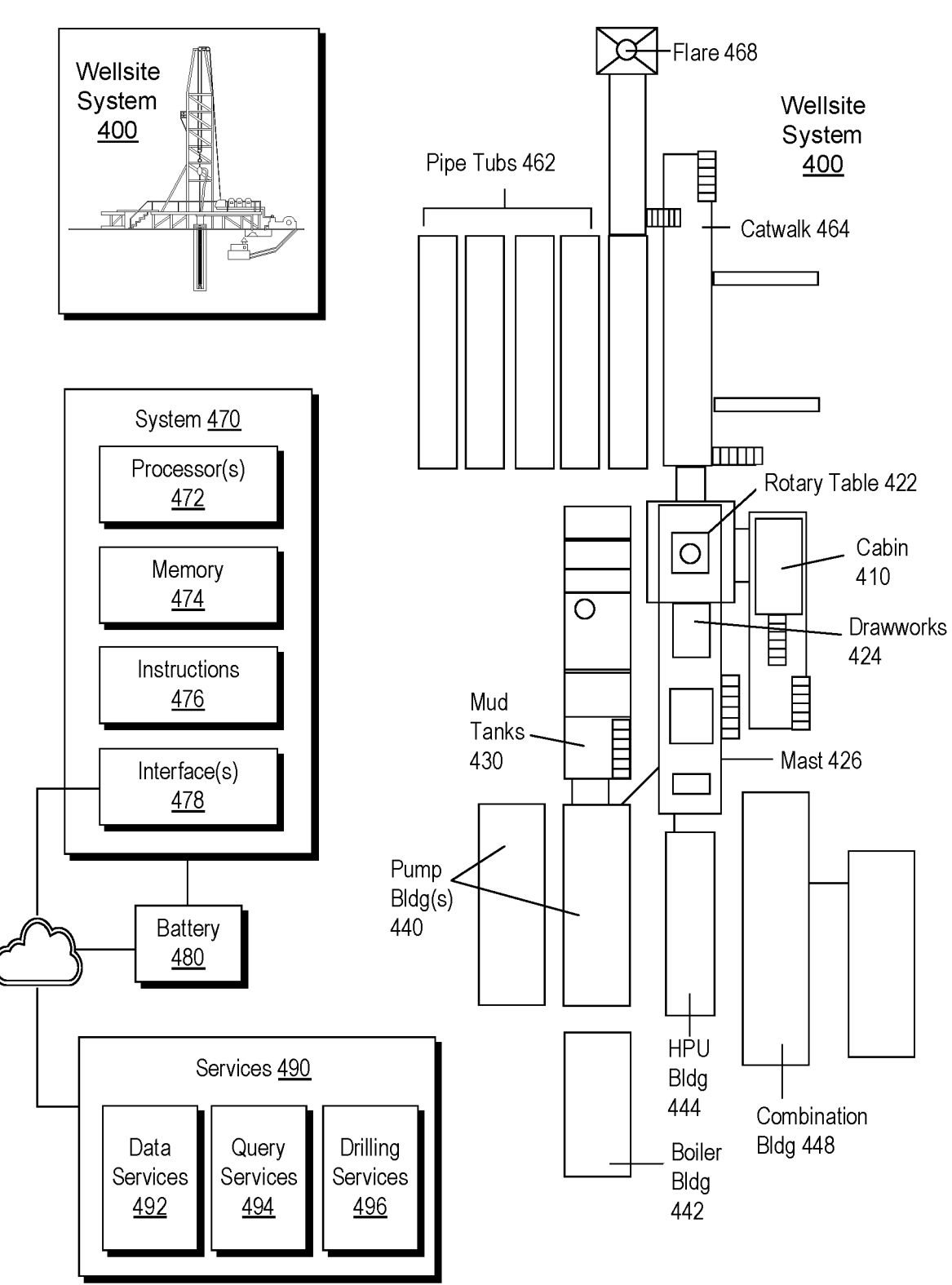
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, the system 470 may be utilized to generate one or more rate of penetration drilling parameter values, which may, for example, be utilized to control one or more drilling operations.

Figure 5:
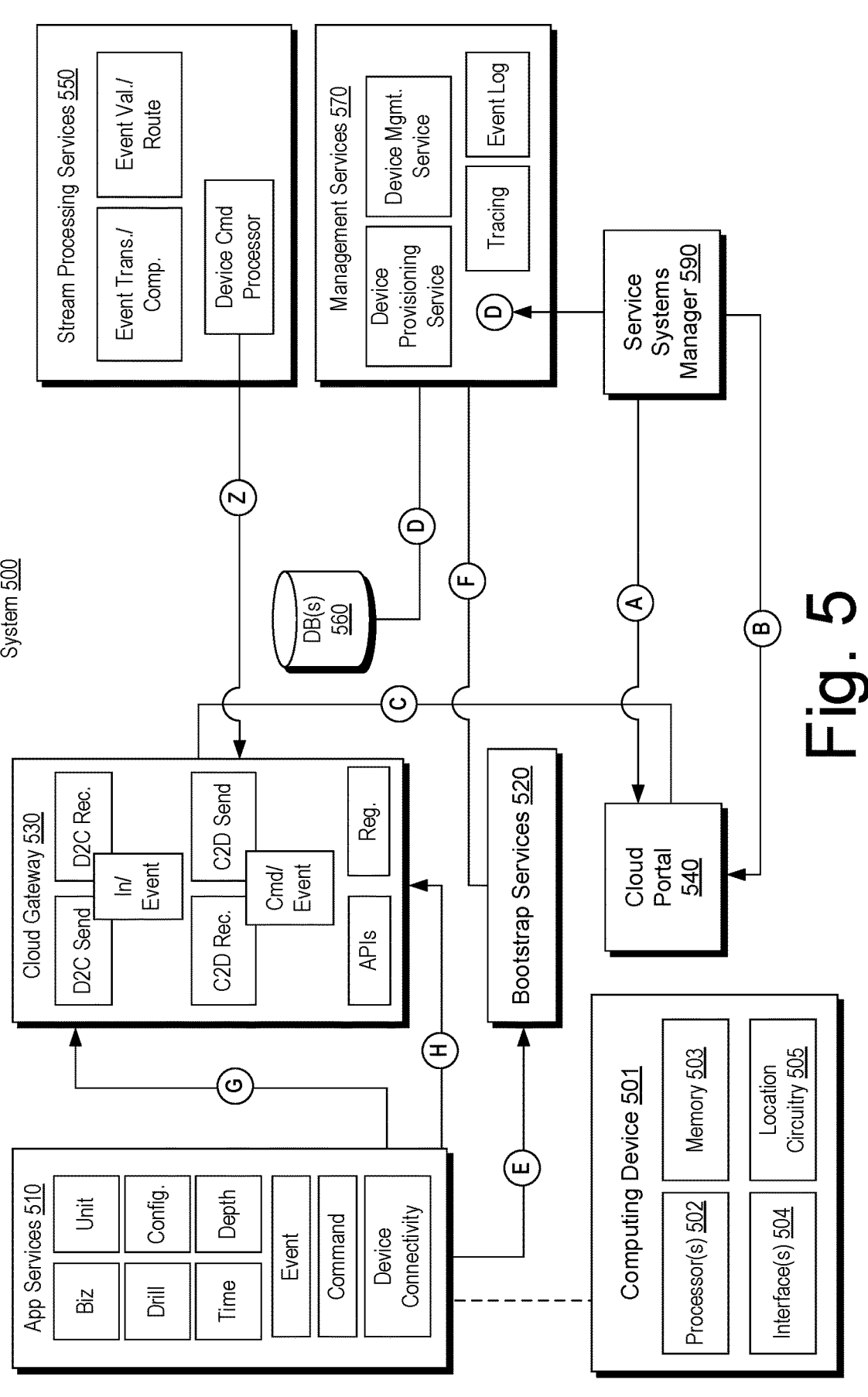
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include WiFi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE.NET SDK with the Service Bus, .NET libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of one or more pieces of equipment, which may be rig equipment, wireline equipment, production equipment, fracturing equipment, etc.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system such as, for example, the system 500, may include features of the AZURE architecture and/or one or more other cloud architectures. As an example, the cloud portal block 540 can include one or more features of an AZURE portal that can manage, mediate, etc. access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
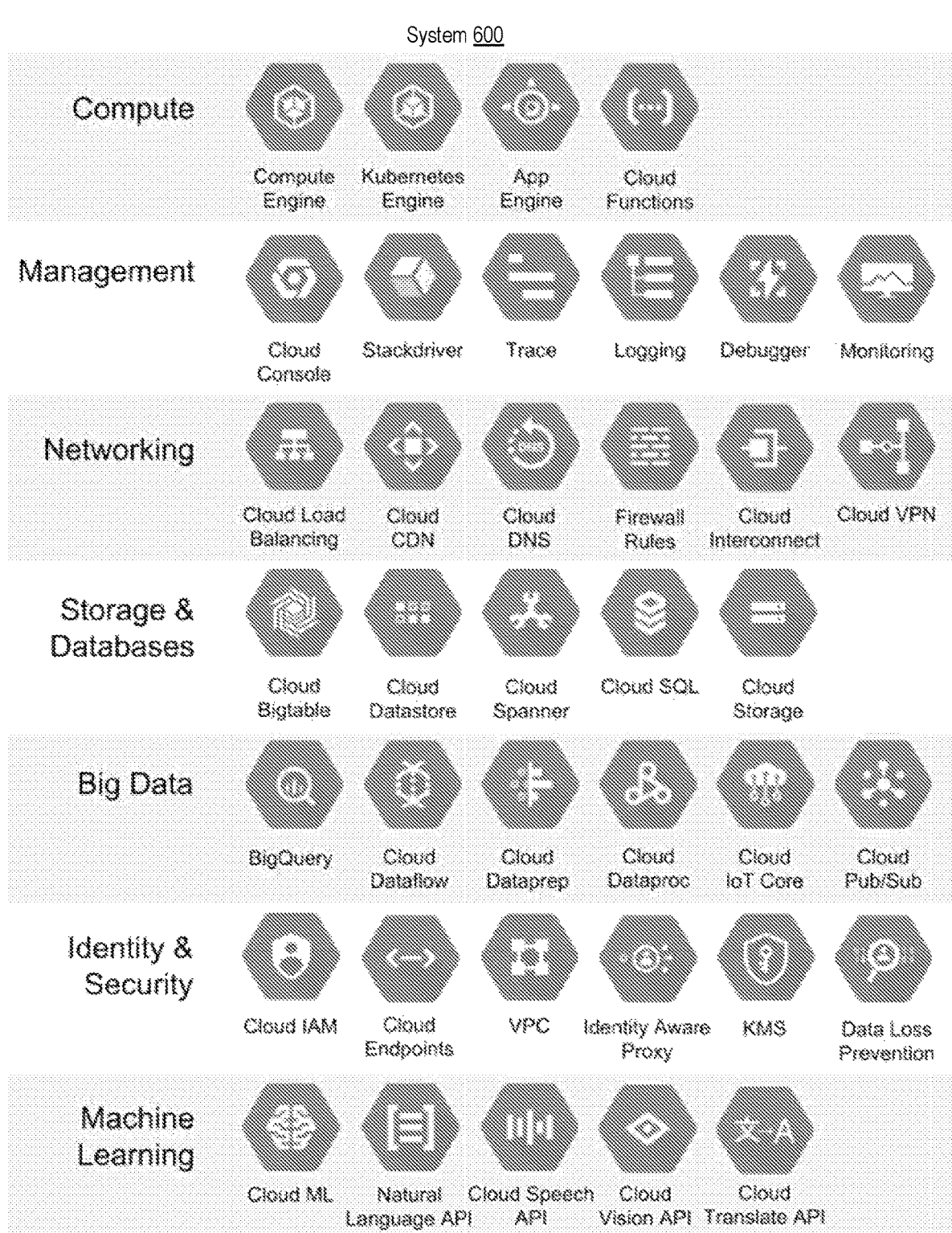
FIG. 6 illustrates an example of a system.

FIG. 6 shows an example of a system 600 that can be at least in part cloud-based. For example, the system 600 can be part of a cloud-based platform or cloud platform. As shown, the system 600 includes compute tools, management tools, networking tools, storage and database tools, large data tools, identity and security tools, and machine learning tools. As shown, the identity and security tools can include a key management service (KMS) tool. Key management can provide for management of cryptographic keys in a cryptosystem, which can include task associated with the generation, exchange, storage, use, crypto-shredding (destruction) and replacement of keys. It can include cryptographic protocol design, key servers, user procedures, and other relevant protocols. As an example, the system 300 can include features of one or more cloud platforms (e.g., GOOGLE CLOUD, AMAZON WEB SERVICES CLOUD, AZURE CLOUD, etc.). As an example, the DELFI cognitive exploration and production (E&P) environment may be implemented at least in part in a cloud platform that includes one or more features of the system 600.

In the GOOGLE CLOUD platform, when an application requests private data, the request is to be authorized by an authenticated entity that has access to the data, which can be part of an OAuth 2.0 flow. In various instances where an application does not demand access to data, a system may utilize a server-centric OAuth 2.0 flow based on a service account. OAuth 2.0 is an industry-standard protocol for authorization. OAuth 2.0 provides specific authorization flows for web applications, desktop applications, mobile phones, living room devices, etc.

A request an application sends to a cloud storage JSON application programming interface (API) that demands authorization is to identify the application to the cloud platform, which may occur in using an OAuth 2.0 token (which also authorizes the request) and/or using the application's API key.

As an example, if a request demands authorization (such as a request for private data), then the application is to provide an OAuth 2.0 token with the request; noting that the application may also provide the API key. As an example, if a request does not demand authorization (e.g., a request for public data), then no identification is demanded; however, the application may still provide the API key, an OAuth 2.0 token, or both. An application in the GOOGLE CLOUD platform can use OAuth 2.0 to authorize requests.

OAuth 2.0 provides for tokens and token management. For example, consider token introspection (see, e.g., RFC 7662), to determine the active state and meta-information of a token, token revocation (see, e.g., RFC 7009), to signal that a previously obtained token is no longer needed, and JAVASCRIPT object notation (JSON) Web Token (JWT) (see, e.g., RFC 7519).

The token introspection extension defines a mechanism for resource servers to obtain information about access tokens. With this specification, resource servers can check the validity of access tokens, and find out other information such as which user and which scopes are associated with the token.

The token revocation extension defines a mechanism for clients to indicate to the authorization server that an access token is no longer needed. This can be used to enable a "log out" feature in clients, allowing the authorization server to clean up security credentials associated with the authorization.

As an example, JWT can provide a way to encode claims in a JSON document and/or object that is then signed. JWTs can be used as OAuth 2.0 Bearer Tokens to encode relevant parts of an access token into the access token itself instead of having to store them in a database.

Self-encoded tokens can provide a way to not store tokens in a database by encoding information in the token string itself. In such an example, an API server may be able to verify access tokens without doing a database lookup on each API request, making the API more scalable.

FIG. 7 shows an example of a system 700 and an example of an architecture 701. As shown, the architecture 701 can provide for one or more security components such as, for example, one or more machine learning models, data, objects, etc., certificates, etc., snapshots, etc. The architecture 701 can include a result interface where an output result can be a control trigger that can call for an action or actions by a piece or pieces of equipment.

As shown, the system 700 can include a power source 702 (e.g., solar, generator, etc.) that can provide power to an edge framework gateway 710 that can include one or more computing cores 712 and one or more media interfaces 714 that can, for example, receive a computer-readable medium 740 that may include one or more data structures such as an image 742, a framework 744 and data 746. In such an example, the image 742 may be an operating system image that can cause one or more of the one or more cores 712 to establish an operating system environment that is suitable for execution of one or more applications. For example, the framework 744 may be an application suitable for execution in an established operating system in the edge framework gateway 710.

In the example of FIG. 7, the edge framework gateway 710 ("EF") can include one or more types of interfaces suitable for receipt and/or transmission of information. For example, consider one or more wireless interfaces that may provide for local communications at a site such as to one or more pieces of local equipment 732, 734 and 736 and/or remote communications to one or more remote sites 752 and 754.

As an example, the EF 710 may be installed at a site that is some distance from a city, a town, etc. In such an example, the EF 710 may be accessible via a satellite communication network.

A communications satellite is an artificial satellite that relays and amplifies radio telecommunication signals via a transponder. A satellite communication network can include one or more communication satellites that may, for example, provide for one or more communication channels. As of 2021, there are about 2,000 communications satellites in Earth orbit, some of which are geostationary above the equator such that a satellite dish antenna of a ground station can be aimed permanently at a satellite rather than tracking the satellite.

High frequency radio waves used for telecommunications links travel by line-of-sight, which may be obstructed by the curve of the Earth. Communications satellites can relay signal around the curve of the Earth allowing communication between widely separated geographical points. Communications satellites can use one or more frequencies (e.g., radio, microwave, etc.), where bands may be regulated and allocated.

Satellite communication tends to be slower and more costly than other types of electronic communication due to factors such as distance, equipment, deployment and maintenance. For wellsites that do not have other forms of communication, satellite communication can be limiting in one or more aspects. For example, where a controller is to operate in real-time or near real-time, a cloud-based approach to control may introduce too much latency. As shown in the example of FIG. 7, the EF 710 may be deployed where it can operate locally with one or more pieces of equipment 732, 734, 736, etc., which may be for purposes of control. As an example, the EF 710 may include switching and/or communication capabilities, for example, for information transmission between equipment, etc.

As desired, from time to time, communication may occur between the EF 710 and one or more remote sites 752, 754, etc., which may be via satellite communication where latency and costs are tolerable. As an example, the CRM 740 may be a removable drive that can be brought to a site via one or more modes of transport. For example, consider an air drop, a human via helicopter, plane or boat, etc.

As to an air drop, consider dropping an electronic device that can be activated locally once on the ground or while being suspended by a parachute en route to ground. Such an electronic device may communicate via a local communication system such as, for example, a local WiFi, BLUETOOTH, cellular, etc., communication system. In such an example, one or more data structures may be transferred from the electronic device (e.g., as including a CRM) to the EF 710. Such an approach can provide for local control where one or more humans may or may not be present at the site. As an example, an autonomous and/or human controllable vehicle at a site may help to locate an electronic device and help to download its payload to an EF such as the EF 710. For example, consider a local drone or land vehicle that can locate an air dropped electronic device and retrieve it and transfer one or more data structures from the electronic device to an EF, directly and/or indirectly. In such an example, the drone or land vehicle may establish communication with and/or read data from the electronic device such that data can be communicated (e.g., transferred to one or more EFs).

As to drones, consider a drone that includes one or more features of one or more of the following types of drones DJI Matrice 210 RTK, DJI Matrice 600 PRO, Elistair Orion Tethered Drone, Freefly ALTA 8, GT Aeronautics GT380, Skydio 2, Sensefly eBee X, Skyfront Perimeter 8, Vantage Robotics Snap, Viper Vantage and Yuneec H920 Plus Tornado. The DJI Matrice 210 RTK can have a takeoff weight of 6.2 g (include battery and max 1.2 kg payload), a maximum airspeed of 13-30 m/s (30-70 mph), a range of 500 m-1 km with standard radio/video though it may be integrated with other systems for further range from base, a flight time of 15-30 minutes (e.g., depending on battery and payload choices, etc.). As an example, a gateway may be a mobile gateway that includes one or more features of a drone and/or that can be a payload of a drone.

As shown in FIG. 7, an EF may execute within a gateway such as, for example, an AGORA gateway (e.g., consider one or more processors, memory, etc., which may be deployed as a "box" that can be locally powered and that can communicate locally with other equipment via one or more interfaces). As an example, one or more pieces of equipment may include computational resources that can be akin to those of an AGORA gateway or more or less than those of an AGORA gateway. As an example, an AGORA gateway may be a network device.

As an example, a gateway can include one or more features of an AGORA gateway (e.g., v.202, v.402, etc.) and/or another gateway. For example, consider an INTEL ATOM E3930 or E3950 Dual Core with DRAM and an eMMC and/or SSD. Such a gateway may include a trusted platform module (TPM), which can provide for secure and measured boot support (e.g., via hashes, etc.). A gateway may include one or more interfaces (e.g., Ethernet, RS485/422, RS232, etc.). As to power, a gateway may consume less than about 100 W (e.g., consider less than 10 W or less than 20 W). As an example, a gateway may include an operating system (e.g., consider LINUX DEBIAN LTS). As an example, a gateway may include a cellular interface (e.g., 4G LTE with Global Modem/GPS, etc.). As an example, a gateway may include a WIFI interface (e.g., 802.11 a/b/g/n). As an example, a gateway may be operable using AC 100-240 V, 50/60 Hz or 24 VDC. As to dimensions, consider a gateway that has a protective box with dimensions of approximately 10 in×8 in×4 in.

As an example, a gateway may be part of a drone. For example, consider a mobile gateway that can take off and land where it may land to operatively couple with equipment to thereby provide for control of such equipment. In such an example, the equipment may include a landing pad. For example, a drone may be directed to a landing pad where it can interact with equipment to control the equipment. As an example, a wellhead can include a landing pad where the wellhead can include one or more sensors (e.g., temperature and pressure) and where a mobile gateway can include features for generating fluid flow values using information from the one or more sensors. In such an example, the mobile gateway may issue one or more control instructions (e.g., to a choke valve, a pump, etc.).

As an example, a gateway may include hardware (e.g. circuitry) that can provide for operation of a drone. As an example, a gateway may be a drone controller and a controller for other equipment where the drone controller can position the gateway (e.g., via drone flight features, etc.) such that the gateway can control the other equipment.

As an example, a mobile gateway may be operable in one or more safety modes. For example, if conditions change, a mobile gateway may be able to issue one or more safety instructions and then fly away to protect the mobile gateway. In such an example, the mobile gateway and data therein (e.g., a black box) may be kept safe. Such an approach may be utilized, for example, where an operational issue arises, where a site is invaded by one or more intruders, etc. For example, consider an intruder that aims to interfere with equipment, which may be to damage equipment, alter the equipment, steal fluid, etc. In such an example, a mobile gateway may detect and/or receive a detection signal and place equipment in a suitable state and then fly away to protect itself. Where an intruder departs, the mobile gateway may return and run an assessment to determine whether a return to operation is possible or not. As mentioned, where a gateway include satellite communication circuitry, a gateway may issue one or more signals such as one or more distress or SOS types of signals that may alert as to a threat, which may be imminent and/or in progress.

As an example, a gateway may include one or more cameras such that the gateway can record conditions. For example, consider a motion detection camera that can detect the presence of an object. In such an example, an image of the object and/or an analysis (e.g., image recognition) signal thereof may be transmitted (e.g., via a satellite communication link) such that a risk may be assessed at a site that is distant from the gateway.

As an example, a gateway may include one or more accelerometers, gyroscopes, etc. As an example, a gateway may include circuitry that can perform seismic sensing that indicates ground movements. Such circuitry may be suitable for detecting and recording equipment movements and/or movement of the gateway itself.

As explained, a gateway can include features that enhance its operation at a remote site that may be distant from a city, a town, etc., such that travel to the site and/or communication with equipment at the site is problematic and/or costly. As explained, a gateway can include an operating system and memory that can store one or more types of applications that may be executable in an operating system environment. Such applications can include one or more security applications, one or more control applications, one or more simulation applications, etc.

As an example, various types of data may be available, for example, consider real-time data from equipment and ad hoc data. In various examples, data from sources connected to a gateway may be real-time, ad hoc data, sporadic data, etc. As an example, lab test data may be available that can be used to fine tune one or more models (e.g., locally, etc.). As an example, data from a framework such as the AVOCET framework may be utilized where results and/or data thereof can be sent to the edge. As an example, one or more types of ad hoc data may be stored in a database and sent to the edge.

As explained, various systems may operate in a local manner, optionally without access to a network such as the Internet. For example, a site may be relatively remote where satellite communication exists as a main mode of communication, which may be costly and/or low bandwidth. In such scenarios, security may resort to local features rather than a remote feature such as a remote authentication server.

An authentication server can provide a network service that applications use to authenticate credentials, which may be or include account names and passwords of users (e.g., human and/or machine). When a client submits a valid credential or credentials to an authentication server, the authentication server can generate a cryptographic ticket that the client can subsequently use to access one or more services.

Authentication can be used as a basis for authorization, which is the determination whether a privilege may be granted to a particular user (e.g., human and/or machine), which may aim to keep information from becoming known to non-participants, and non-repudiation, which is the inability to deny having done something that was authorized to be done based on the authentication.

In the field, a scenario can arise where two or more computational devices are to be paired for communication (e.g., uni- and/or bi-directional transmissions, etc.) via one or more secure channels without having to access the Internet. For example, consider a scenario where a link to the Internet is unavailable, is of too low a bandwidth, is lacking security, is lacking stability, etc. In such a scenario, a local technique may be employed to establish one or more secure channels.

As an example, security may utilize a technique such as Transport Layer Security (TLS). TLS is a cryptographic protocol designed to provide communications security over a computer network and finds use in applications such as email, instant messaging, and voice over IP along with use as a security layer in HTTPS. The TLS protocol aims primarily to provide privacy and data integrity between two or more communicating computer applications. TLS can run in the application layer of the Internet and include two layers: the TLS record and the TLS handshake protocols.

TLS can make guarantees about encrypting data as it moves across a network and can provide a mechanism to enforce absence of a "man-in-the-middle". For public-facing services, as explained, an authentication server can be available on the Internet, for example, as a public certificate authority. Where two machines are under common control (e.g., control the server and each client), then a technique can be employed to have a dedicated certificate authority to sign certificates.

For example, during a TLS handshake, a client and a server can exchange pleasantries and carefully begin setting up a secure tunnel. During this process the client can check that the certificate presented by the server is signed by a trusted authority (e.g., or chain of authorities). Various TLS libraries include features that can allow a client to authenticate that a common name of a certificate matches a hostname it is trying to connect to. Such checks can allow the client to assert that the server is actually who the client believes it is and communication is not being intercepted.

Besides transport security, services can provide for authentication of who is making a call(s) and help to ensure that the caller is authorized to do so. TLS provides a mechanism to perform such tasks. For example, a client can authenticate a server's certificate in that it is cryptographically valid and the server can similarly authenticate the client. In such an example, during a handshake, the server can request a certificate from the client, which it can provide. Mirroring the client, the server can check the validity of the certificate against a trusted certificate authority. However, the server can then extract out the details of the client from the certificate, such as the common name, and rather than checking against a hostname can use application-layer logic to authenticate the client is authenticated and authorized to do what they are trying to do. Such bidirectional TLS authentication allows both sides of the connection to assert they are connecting with the other party they expect.

Bidirectional TLS can introduce some "pain points" such as creating and managing certificates and an associated revocation list(s). However, managing a set of allowed certificates can be akin to managing a set of allowed API keys. For example, consider managing a specific set of revoked certificates, acting as an exclusion list. However, if client certificates are treated as API keys they can instead be managed by allowed clients via a known whitelist. In such an approach, a system can gain cryptographic assurance that a client is who it says it is, while also ensuring communication is encrypted.

As an example, a system may utilize a trust on first use (TOFU) approach to couple a control gateway to a control system (e.g., one or more PLCs that control machinery, etc.). Such an approach may involve an exchange of public certificates where a user reviews that thumbprints for each public certificate is the same on a sender UI and a recipient UI. In such an approach, at no point is the private key shown or accessible to a user. Validating the thumbprint integrity and setting one peer to trust it can be referred to as pinning the certificate. For example, consider performing one or two pinnings.

As an example, a system may implement an approach that operates without accessing a remote server such as a remote authentication server. In such an example, each node can generate its own key and certificate, which can be self-signed certificates (e.g., without a demand for Internet access). In such an example, an out-of-band approach can be utilized to verify one or more thumbprints. For example, consider a mobile application executing on a smartphone that can capture graphical codes such as QR codes (e.g., QRCs) from a sender and a recipient representing one thumbprint and matching them, green thumb to a user. In such an example, the process can be performed twice or, for example, a graphical code can include two thumbprints (e.g., sender and recipient).

As an example, a system can be implemented that allows more than two computing devices to be paired. As an example, a maintenance mode type of pairing may be available (e.g., on an administrative level, etc.), which may provide an admin option in a UI. As an example, a QR code may be rendered to human machine interfaces of pairing machines. As explained, verification may be performed utilizing a mobile application (e.g., mobile "app"), for example, via use of QR codes displayed by peers on their respective interfaces (e.g., displays, etc.). While various codes may be visual (e.g., graphical), a code may be graphical and/or audible. For example, consider a video code or an image with audio. As an example, an app may be a proprietary app that can be installed on a secure device that has been pre-approved, authenticated, etc.

As an example, an app may provide for recording one or more pairings, for example, consider storing to local memory where such memory may be accessed and downloaded to a central repository (e.g., the cloud via the Internet, etc.). In such an example, the downloading may occur once a secure link is established to the Internet (e.g., once out of a remote site and in a more urban site, etc.).

As an example, an app may provide for pairing of machine via a graphical user interface, which may provide a diagnostics QR graphic, where, for example, the mobile app may render topology or one or more other factors of interest, optionally using an augmented reality approach. For example, one or more cameras may be utilized for scanning, image capture, video capture, audio capture, etc., where an app can augment such real data. For example, consider rendering of one or more sensor readings, one or more connections, history, etc. As an example, an app may employ image recognition circuitry that can identify one or more pieces of equipment or a portion or portions thereof.

FIG. 8 shows an example of a system 800 that includes a piece of equipment that can render a graphical code that can relate to the status of the piece of equipment. For example, a smartphone can utilize a camera to capture the graphical code and to instruct an app on the smartphone to provide information as to the status. As shown in FIG. 8, an augmented reality (AR) environment can be created where a camera captures images of the piece of equipment and renders the images to a display with content corresponding to the status per the graphical code. In the example of FIG. 8, the status pertains to network equipment where various ports are active, which may be, for example, power over Ethernet ports of a network device. While the approach of FIG. 8 shows the code 810, a short-range communication technique may be employed such as, for example, BLUETOOTH, NFC, etc.

As an example, a graphical code may provide security information that can be utilized to authenticate and establish a secure connection. For example, a pairing may occur via a graphical code where the graphical code may include status information that can be decrypted once authentication occurs or, for example, consider switching from one graphical code for authentication to another graphical code for status responsive to authentication.

While graphical codes are mentioned, one or more other techniques may be implemented additionally and/or alternatively. For example, consider short range communication, a microphone, and a speaker, etc. As an example, a graphical code and/or other code itself may be encrypted. For example, consider an encrypted QR code, an encrypted audio signal, etc., where a mobile app or other device can sense the information and, with proper credential(s), decrypt it as a part of a method that then utilizes the decrypted information for authentication to establish pairing (e.g., a secure connection).

As an example, an edge device or another device (e.g., a mobile device) may include environment detection circuitry. For example, consider gravity detection, magnetic field detection, atmospheric pressure detection, altitude detection, etc. In such examples, one or more detected environment characteristics may be utilized in a secure edge system. For example, consider a magnetic field signature that can confirm that a piece of equipment is at or likely to be at a particular location on the Earth. As an example, signatures, signals, etc., may include vibration, time of day, day/night, etc.

FIG. 9 shows an example of a system 900 that includes various pieces of equipment 910, 920, 930, 940 and 950. As an example, the equipment 910 can be part of a RHEOPROFILER computational system that includes a panel (PPC1), an AGORA gateway (AGW), and another panel (PPC2) for an optional system (e.g., PnP) where communication between the AGW and PPC2 may be via the GRPC (or grpc or gRPC). In such an example, the AGW and PPC1 can be part of a RHEOPROFILER box. In FIG. 9, the equipment 960 can be a network switch and/or other network equipment that may include a switch. In the example of FIG. 9, the equipment 960 may be susceptible to an attack (e.g., malicious activity), which may be via a physical presence at the site. The system 900 may include one or more features of a wellsite system and/or another system. As shown in FIG. 9, the equipment 910 can include a sample holder and a display where a fluid sample (e.g., drilling fluid, etc.) can be disposed in the sample holder. The equipment 910 can generate output where such output may be utilized in one or more operational decisions (e.g., control of equipment, etc.).

In gRPC, a client application can directly call a method on a server application on a different machine as if it were a local object, making it easier to create distributed applications and services. As in various RPC systems, gRPC involves defining a service, specifying methods that can be called remotely with their parameters and return types. On a server side, the server implements this interface and runs a gRPC server to handle client calls. On a client side, the client has a stub (referred to as just a client in some languages) that may provide the same methods as the server. As an example, gRPC clients and servers can run and talk to each other in a variety of environments and can be written in a gRPC supported language. For example, a gRPC server can be created in JAVA language with clients in GO, PYTHON, and/or RUBY languages. As an example, one or more APIs can include gRPC versions of their interfaces, which may allow for building functionality into an application.

As an example, a method can include defining a service and specifying methods that can be called remotely with their parameters and return types. A system may utilize protocol buffers as an Interface Definition Language (IDL) for describing a service interface and structure of payload messages; noting that one or more additional and/or alternative approaches may be utilized.

As mentioned, the RHEOPROFILER system can include smart entities such as PPC1, AGW and PPC2. In such an example, the AGW can use gRPC to exchange data and commands with PPC1 and PPC2 may provide for PnP; noting that PPC2 and AGW may also utilize gRPC.

As an example, consider a scenario where a failure occurs of a RHEOPROFILER system (e.g., PPC1 and AGW) or PnP (e.g., PPC2). In such an example, one of the two can be replaced, which demands that the new "box" be able to interact with the remaining peer. Hence, pairing in this case will be between PPC2 and AGW, where PPC1 and PPC2 are not aware of each other.

Another scenario can be for the pairing of PPC1 and AGW at the field base, where PPC1 or AGW can be replaced inside a RHEOPROFILER enclosure (e.g., "box"). In such an example, there may be Internet access if available and demanded or there may be an alternate mechanism of delivery for ease of manufacturing.

In a RHEOPROFILER example, each peer in the system can provide a QR code with its own public key's thumbprint. For example, consider the example peers' thumbprints.

For the example given, the QR on PPC1 could include the info:

| Network | node type | IP (hexa) | thumbprint | status |
|---------|-----------|-----------|------------|--------|
| 1 | self | C0A80102 | a031c46782e6e6c662c2c87c76da9aa62ccabd8e | paired |
| 1 | peer | C0A80103 | f21c12f46cdb6b2e16f09f9419cdff328437b2d7 | paired |
| 2 | self | C0A8020C | a031c46782e6e6c662c2c87c76da9aa62ccabdff | pending |
| 2 | peer | C0A8020D | f21c12f46cdb6b2e16f09f9419cdff328437b2ff | pending |

QR on PPC2 could include:

| Network | node type | IP | thumbprint | status |
|---------|-----------|-----|-----------|--------|
| 1 | self | C0A8020D | f21c12f46cdb6b2e16f09f9419cdff328437b2ff | pending |
| 1 | peer | C0A8020C | a031c46782e6e6c662c2c87c76da9aa62ccabdff | pending |

As an example, a web app could reconcile that both nodes being paired are those with IP C0A8020C and C0A8020D, check that the info in both QR is matching and show a green light to a user to click a "pair" button on PPC1 and PPC2's UIs. For example, consider a graphic that indicates "Network 2 is good to go". However, if somehow there was instead a non-matching thumbprint, the app could render a red light.

As an example, consider a QR on PPC2 with attempt of man in the middle attack, having a close but non-exact match of thumbprint:

| Network | node type | IP | Thumbprint | status |
|---------|-----------|-----|-----------|--------|
| 1 | self | C0A8020D | f21c12f46cdb6b2e16f09f9419cdff328437b2ff | pending |
| 1 | peer | C0A8020C | a031c46782e6e6c662eec87c76da9aa62ccabdff | pending |

Additionally, an app could show the topology of the system with just a bit more info:

| Network | node type | IP | thumbprint | status | |
|---------|-----------|-----|-----------|--------|---|
| 1 | self | C0A80102 | a031c46782e6e6c662c2c87c76da9aa62ccabd8e | paired | rp.kbox.eth1 |
| 1 | peer | C0A80103 | f21c12f46cdb6b2e16f09f9419cdff328437b2d7 | paired | rp.ppc1.eth0 |
| 2 | self | C0A8020C | a031c46782e6e6c662c2c87c76da9aa62ccabdff | pending | rp.kbox.eth0.3 |
| 2 | peer | C0A8020D | f21c12f46cdb6b2e16f09f9419cdff328437b2ff | pending | |
| 3 | self | C0A80316 | | | rp.kbox.eth0 |
| 3 | ext | C0A80317 | | | |

FIG. 10 shows example codes 1010 and 1030 that may be generated to represent one or more types of information where the code 1010 may correspond to the foregoing information. And consider, the following, as corresponding to the code 1030.

As an example, a method may include utilizing a mobile device that can be carried by a person, a robot, a drone, etc. For example, consider a smartphone that can include a camera, a microphone, a short-range communication circuit, etc. While it may be possible to pin certificates just on first

| Network | node type | IP | thumbprint | status | |
| --- | --- | --- | --- | --- | --- |
| 1 | self | C0A8020D | f21c12f46cdb6b2e16f09f9419cdff328437b2ff | pending | pnp.ppc2.eth0 |
| 1 | peer | C0A8020C | a031c46782e6e6c662c2c87c76da9aa62ccabdff | pending | |
| 2 | self | C0A80421 | | | pnp.ppc2.eth1 |
| 2 | peer | C0A80422 | | | pnp.plc.eth0 |

Figure 11:
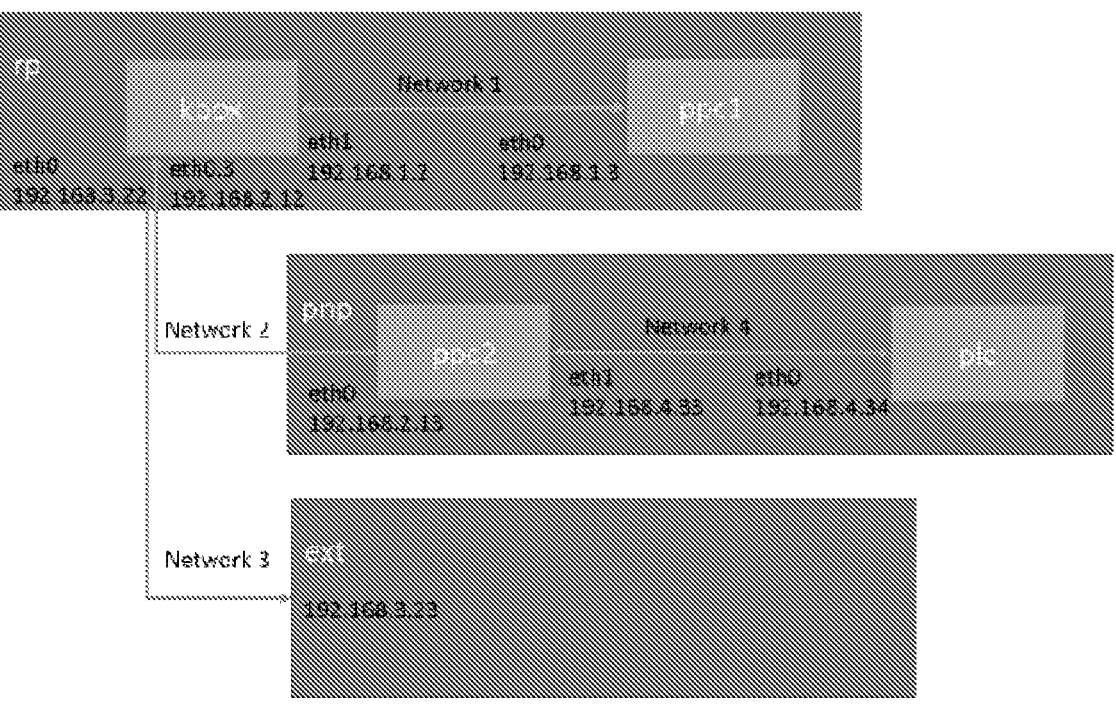
FIG. 11 illustrates an example of a graphic.

FIG. 11 shows an example of a graphic 1100 that may be generated and rendered to a display. For example, consider the tables and graphics as being a basis for generation of the graphic 1100, which can utilize a special color to show that "network2" is deemed good based on the QRs.

As an example, data gathered from both QRs in the foregoing example may be sent to the field base or an ops base for help in debugging where appropriate. As an example, a graphic may be generated that can add one or more previous thumbprints of each Ethernet port, one or more MAC addresses, one or more TCP ports of an external client, and/or a port hit on RP, and for UDP or TCP, etc.

As explained, various challenges with cybersecurity at an edge can exist. For example, consider a challenge that is related to authentication between devices where such devices are to be able to transfer information (e.g., data, commands, etc.). In various instances, one or more connected devices at the edge may be legacy devices such that they were not built with security in mind but continue to operate today. Such legacy devices may be at risk of an attack. For example, consider an attacker that aims to install a small but capable rogue device on the network (e.g., network switch, etc.) to be able to see and modify communication between various devices.

As explained, various techniques may be employed to secure inter-device communications, to reduce risk of data disclosure, technology loss, reputation loss, etc. Some hackers may aim to take over a control system and cause serious operational accidents, which may include life-threatening events, environmental-threatening events, etc. Where connectivity exists beyond the local devices, an attack may potentially spread through an enterprise.

While secure communications using security controls such as encryption and integrity checks can be utilized, they may be insufficient. To improve security, secure and verifiable identities can be implemented such that risk is reduced as to an attacking device pretending to be a legitimate device. For example, a rogue device may be pretending to other devices that it is a RHEOPROFILER extension box (e.g., a type of spoofing, etc.).

As an example, certificates can be utilized for secure and verifiable identities for devices. In such an example, when two devices first connect, they exchange their identities and establish trust. However, this action may be exploited when an attacker's rogue device reaches the genuine device first. In such a scenario, a mitigation effort can include adding verification in the process of initial trust establishment. For example, consider a visual verification performed once by a specialist at a wellsite. However, such an approach to verification can still pose risks. To improve security, as explained, a code-based approach may be utilized in a manner that may not demand Internet connectivity.

connection without supervision (e.g., trust on first use), such trust on first use can be exploited by attacker. With a human involved, whether locally or remotely, certain risks can be mitigated where that human is provided with ample technology, which may be local and not demanding a connection to the Internet. Such an approach can include automatically checking certificate thumbprints and may optionally include a manual check, however, manual checks using a human alone (e.g., human vision) can be tedious and error-prone.

As explained with respect to the example of FIG. 9, a system can include a RHEOPROFILER system with an extension module (e.g., extension equipment). In such an example, each device is to have both a secret identity and a public identity that can be checked against one another.

Figure 12:
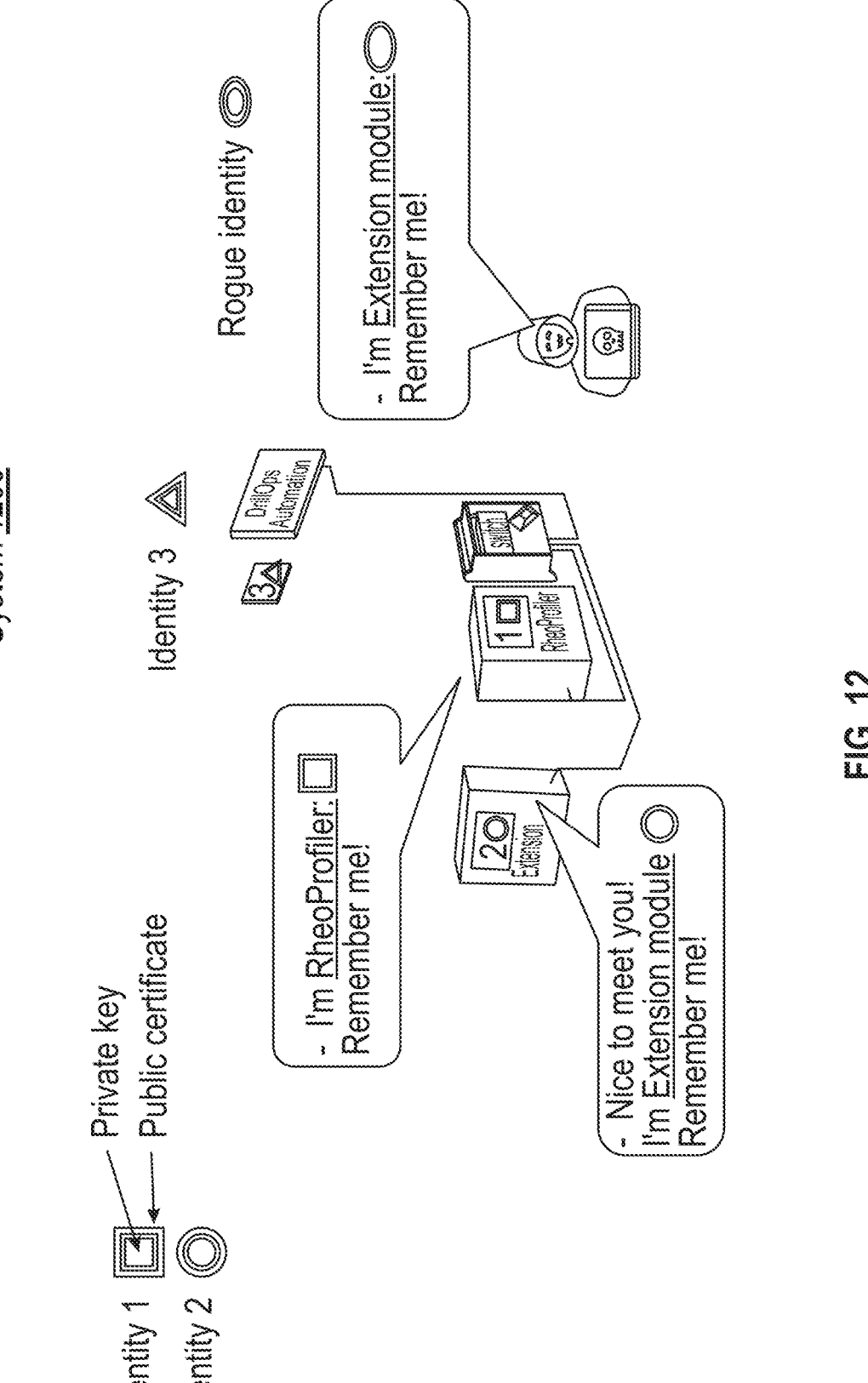
FIG. 12 illustrates an example of a system.

FIG. 12 shows an example system with various equipment. A 2 fit by design, as represented in the shapes used in FIG. 12, can be implemented. In such an approach, a public part of the identity may be embodied in a certificate (e.g., a public certificate) where a private part (e.g., private key) cannot be deduced from the public part. Each device can then try and publish its public identity for others to use as reference from then on. However, the question arises in that "how can these be trusted?" In the example of FIG. 12, an attacker is competing to have its device's identity take the place of the real extension module. In a connected scenario, each device may get an identity known to a cloud when manufactured where pairing is performed in the cloud then uploaded to the devices. However, the example of FIG. 12 is a disconnected scenario where identities are not known and where the checking mechanism is to be local (e.g., without Internet access).

As explained, a method can address a trust aspect and allow for scaling to more than two devices. For example, consider a third device as an automation device for drilling operations.

FIG. 13 shows an example of a system 1300 along with a streamlined pairing process. As shown via three displays, three machines are trying to pair. As mentioned, verification of the public certificates can be manual on the ground involving reading thumbprints and comparing them visually. In such a manual approach, a human or humans read the thumbprints on the same row to see if they match. From FIG. 13, it is apparent that such manual, visual matching is an arduous task. Such a task becomes even more arduous where the number of devices increases (e.g., consider 10 devices with 10 displays throughout a rig, and not neatly organized). As an example, a method can include converting data that is to be checked into one or more types of codes (e.g., QR codes, etc.). In such an example, each display may render its own QR code representing a thumbprint of each certificate, including its own.

FIG. 14 shows an example system 1400 where, for example, a mobile app can be utilized to scan QR codes and make the comparisons. In such an example, a technician may have made a mistake if checking for the beginning and end of the thumbprints alone; whereas the mobile app would discover foul play by identifying an elliptical identity different from the expected circular one (e.g., which may be color coded for ease of analysis).

In such an example, a method can include issuing a warning and/or taking other action to investigate what on the network is impersonating the extension module. For example, consider a kill switch that may automatically shut down a network switch such that the malicious device is blocked from accessing one or more other pieces of equipment. Or, for example, consider a port block that may automatically be implemented to block access by the malicious device. In such examples, a mobile device running the app may include a short-range communication circuit that can communicate with the network switch at a high/administrative level such that a signal can override a local, network switch control signal. As explained, a kill switch may be utilized, which may, for example, be connected to a power supply such that once the power supply is disconnected, the network switch no longer operates. Once a malicious attack is thwarted, repairing of valid equipment may commence, optionally with renewed identities as there may be expiration automatic and/or triggered.

As an example, a system may provide for security at one or more workstations at a site (e.g., a wellsite, etc.). For example, consider a scenario where operators are instructed to change passwords on a regular basis (e.g., every month, etc.). In such an example, if an operator forgets a password, delay and/or trouble may follow. Approaches such as writing down passwords on paper presents a security risk.

A field site may also present challenges as to credential management at the edge where there is poor or no connectivity to the Internet. When good connectivity exists, a remote authentication server may be utilized. In such an example, multi-factor authentication, biometrics, account synchronization may be available. However, for offline or poor connectivity scenarios, a system resorts to local credential management, which can be quite problematic as to usability and security.

If local credentials are stolen, a whole fleet of devices using them may demand manual reconfiguration, which can waste time and resources. If shared credentials are stolen, it can be difficult to detect their misuse at first.

As an example, a system can include security tokens for offline authentication. For example, consider hardware security tokens using, for example, FIDO2, water and crush resistant hardware, copy resistant hardware, USB, NFC, BLUETOOTH hardware, hardware with biometric support, etc. A hardware based unique identity may be utilized that can provide a security token (e.g., a hardware security token).

For example, a user can use a token with a device to authenticate to a local application that supports the FIDO2 webauthn standard. In such an example, the token can be linked to a user role(s), so the user gets permission on a specified system(s). As an example, an application can know about the user token via a pre-registration process. As an example, master tokens can be specially authorized to register or revoke other users' tokens. As an example, a PIN code may be set during token registration, which may be easier to use than a changing complex password. Such an approach can be tiered such that a PIN provides for access to a hardware token. As an example, where a certain level of connectivity exists, pre-register may be supplanted by using the cloud and synchronizing securely with the edge application. As an example, a method can include application login, inserting a hardware token component into a device, and tapping on a GUI graphical control (e.g., or other button, surface, etc.), which may be a blinking button on the hardware token.

As an example, a system can provide for security monitoring for IIoT/IoT devices on challenging connectivity links. As explained, one or more IIoT devices may be deployed in considerably challenging places that may be without coverage from an Internet provider. In such situations, a low-bandwidth very expensive satellite link (e.g., BGAN, IRIDIUM, etc.) may be available but impractical for one or more reasons. Such connectivity may be enough for infrequent telemetry but can restrict or even blocks various functions for IIoT devices (e.g., OTA software updates or security monitoring).

IT security monitoring can be based on sending activity logs to the cloud/enterprise data center, which can include: security software to analyze the logs and generate alerts (ready to receive high volume of logs, requires powerful clusters to analyze the logs, expensive, with complex granular GUIs for cybersecurity professionals); and software and cybersecurity teams available to automate alerts generation and help with protection and response to security attacks. At the edge, such features/capabilities can be unavailable and may be impractical given limited connectivity (e.g., satellite connectivity limitations, etc.).

As an example, a system can provide security monitoring for such scenarios, for example, with high fidelity and valuable security alerts/information, though some may be limited as to particular use case restrictions. As an example, a system can provide for security in disconnected and/or connected cases. As an example, a system may work in parallel and enrich an IT full activity log gathering system.

As to monitoring, consider a wellsite as an example, where monitoring may be able to recognize a rogue device in an enclosure (e.g., a box, etc.). Monitoring can provide for detection of attacker attempts, compromised devices, etc., even where slow connectivity or no connectivity exists.

Connectivity matters at a field site as edge devices are more useful where connectivity exists. As an example, an approach can involve asking devices to send activity logs to a central cluster where one or more cybersecurity experts are present. Such experts may use special software to automate alert detection where they may also monitor themselves and use their knowledge. A cybersecurity expert may also know how to coordinate a response to an attack and recover from an attack.

Figure 15:
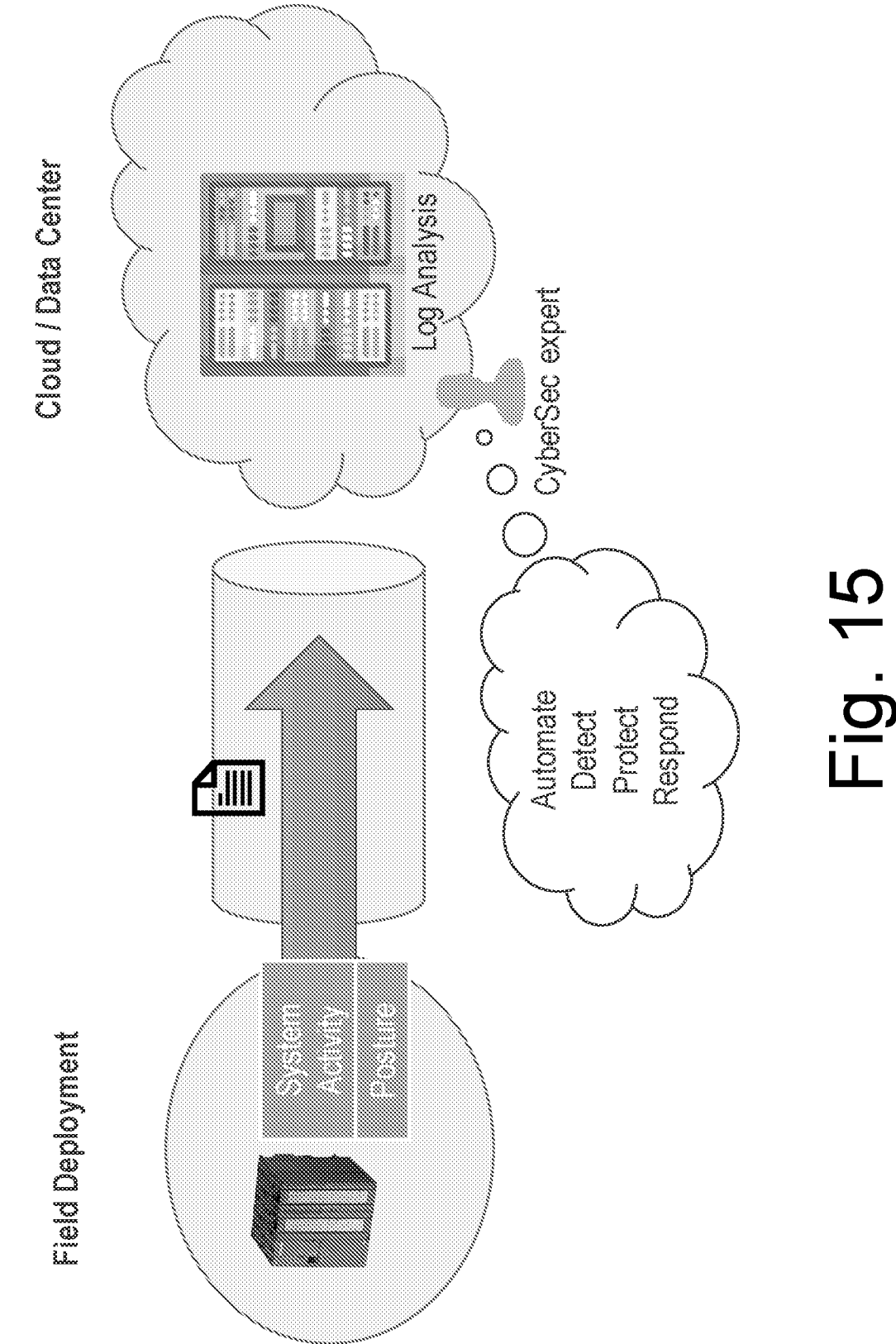
FIG. 15 illustrates an example of a system.

FIG. 15 shows an example of a system where field equipment may transmit information to the cloud and/or a data center where experts are available. As explained, where bandwidth is very limited and/or unavailable, transmission of logs may be impractical and/or otherwise not timely. Hence, remote resources may be unavailable.

Figure 16:
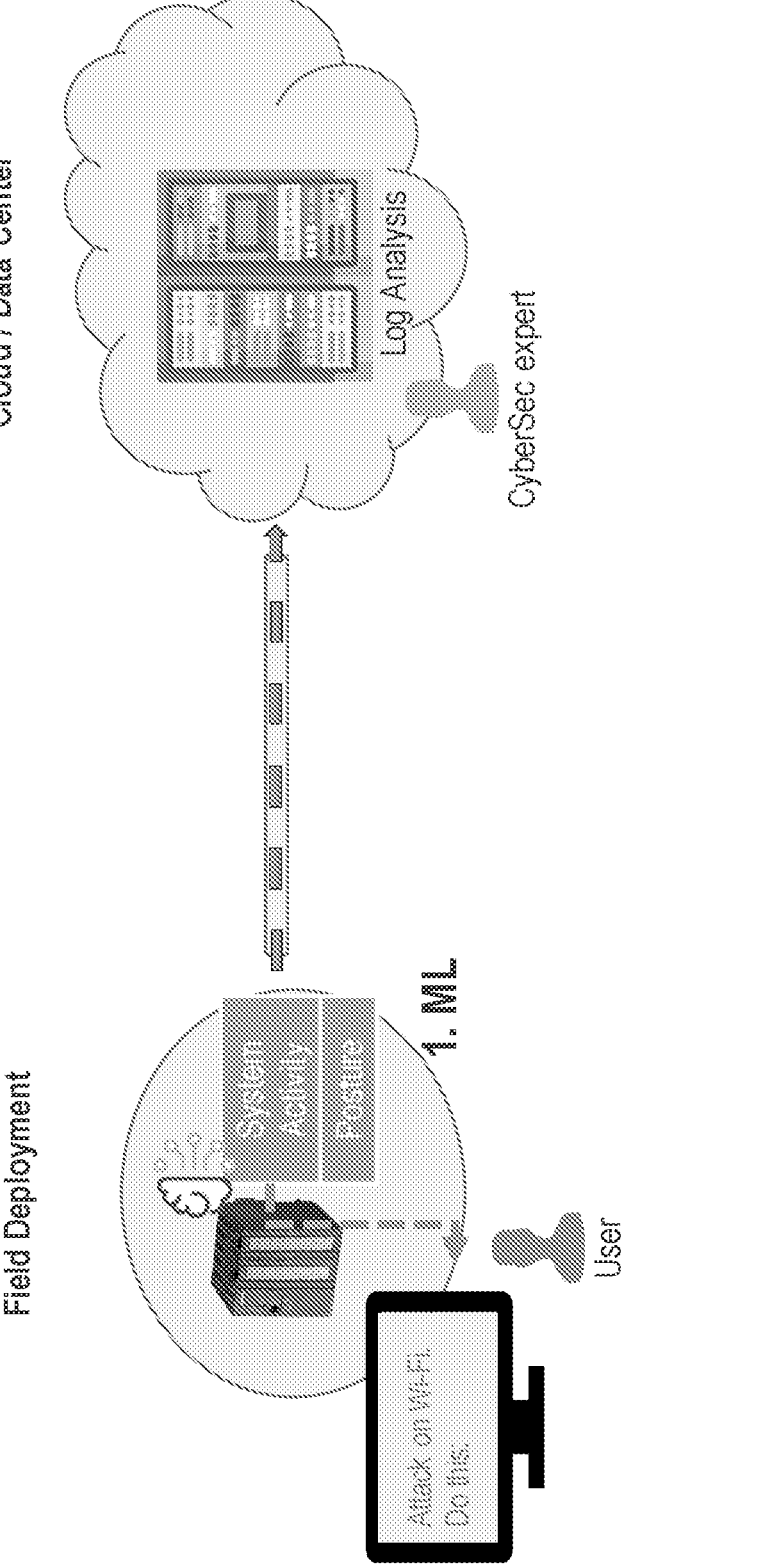
FIG. 16 illustrates an example of a system.

FIG. 16 shows an example of a system 1600 where one or more machine learning models may be implemented. For example, consider learning normal (e.g., acceptable) device operation patterns and reporting unusual (e.g., unacceptable) activity. Such an approach may reduce traffic. In such an example, with mature ML model(s), such a system may include reporting to a local dashboard where, for example, non-experts can understand the nature of the attacks and response vectors. As an example, efficiency and accuracy can increase with ML model maturity.

In various instances, analysis of the system activity for some devices may not be straightforward, which may give rise to a risk that it will not detect and miss some malicious activity. To address such an issue, consider providing field equipment/system knowledge, where, for example, system objects, be they binaries or configuration files, kernel, drivers, etc., are sufficiently known and/or characterized/characterizable. Such objects may be objects that hackers would likely target. As an example, a method can include taking (e.g., creating) fingerprints of such objects and saving them as a known good state. In such an example, a system posture monitoring can include comparing current system state with the known good state where, if it differs, a security alert will be generated. As an example, a method can include, for planned patching, retaking the good state snapshot (e.g. thumbprint, signature, etc.).

Figure 17:
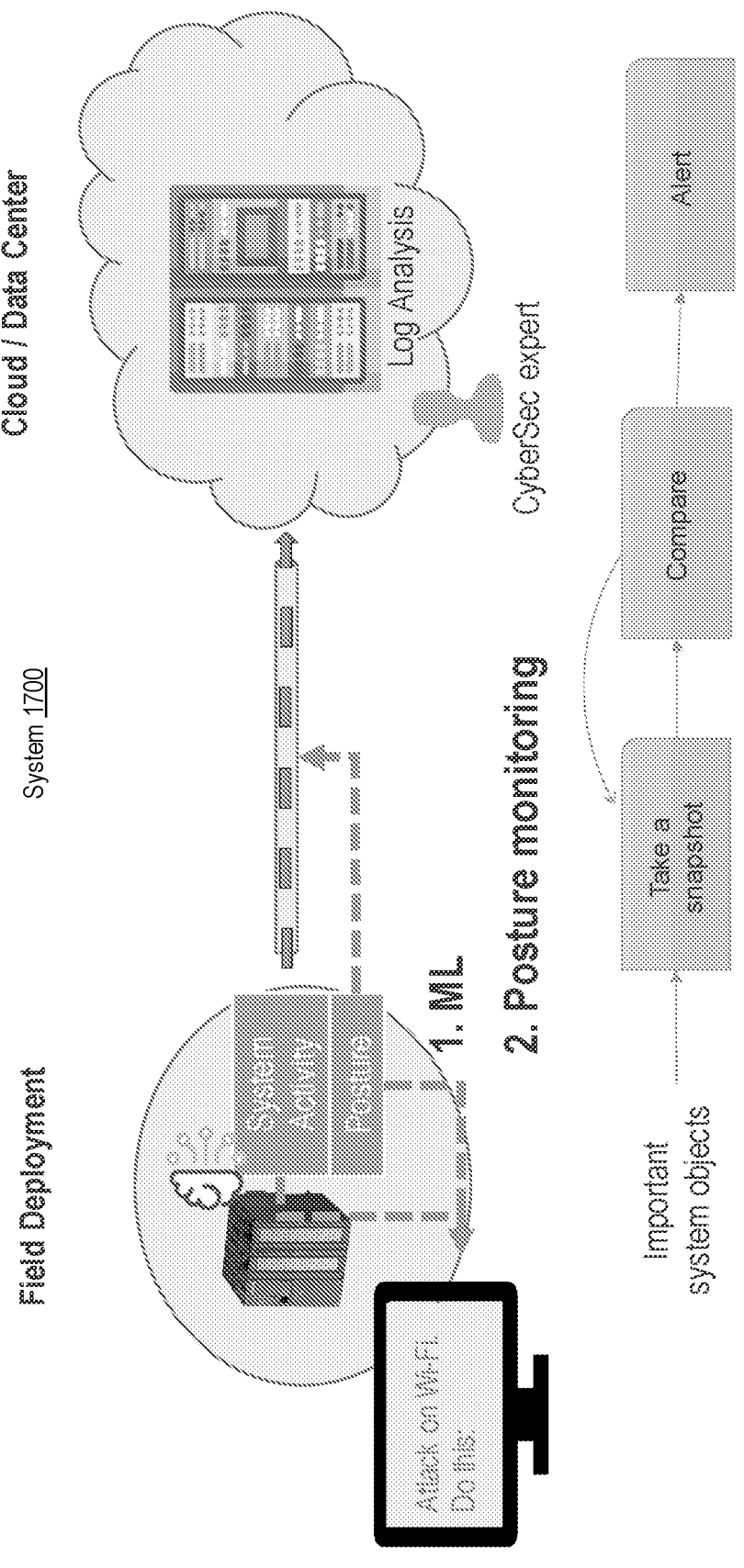
FIG. 17 illustrates an example of a system.

FIG. 17 shows an example of a system 1700 that can provide for machine learning model implementation and posture monitoring (e.g., using thumbprints, etc.). As shown, output of one or more trained ML models may be utilized locally and/or remotely (e.g., optionally using compression, codes, etc.).

As an example, a system can utilize a hybrid approach to security monitoring that includes one or more ML models and thumbprint comparison. Such an approach can provide for high fidelity security alerts for edge devices, even if they are deployed in places with expensive low bandwidth connectivity or offline.

Figure 18:
FIG. 18 illustrates an example of a system.

FIG. 18 shows an example of a system 1800 that includes machine learning features and posture monitoring features, which may be suitable for edge security, high fidelity alerts, low bandwidth operation, offline operation, etc.

Figure 19:
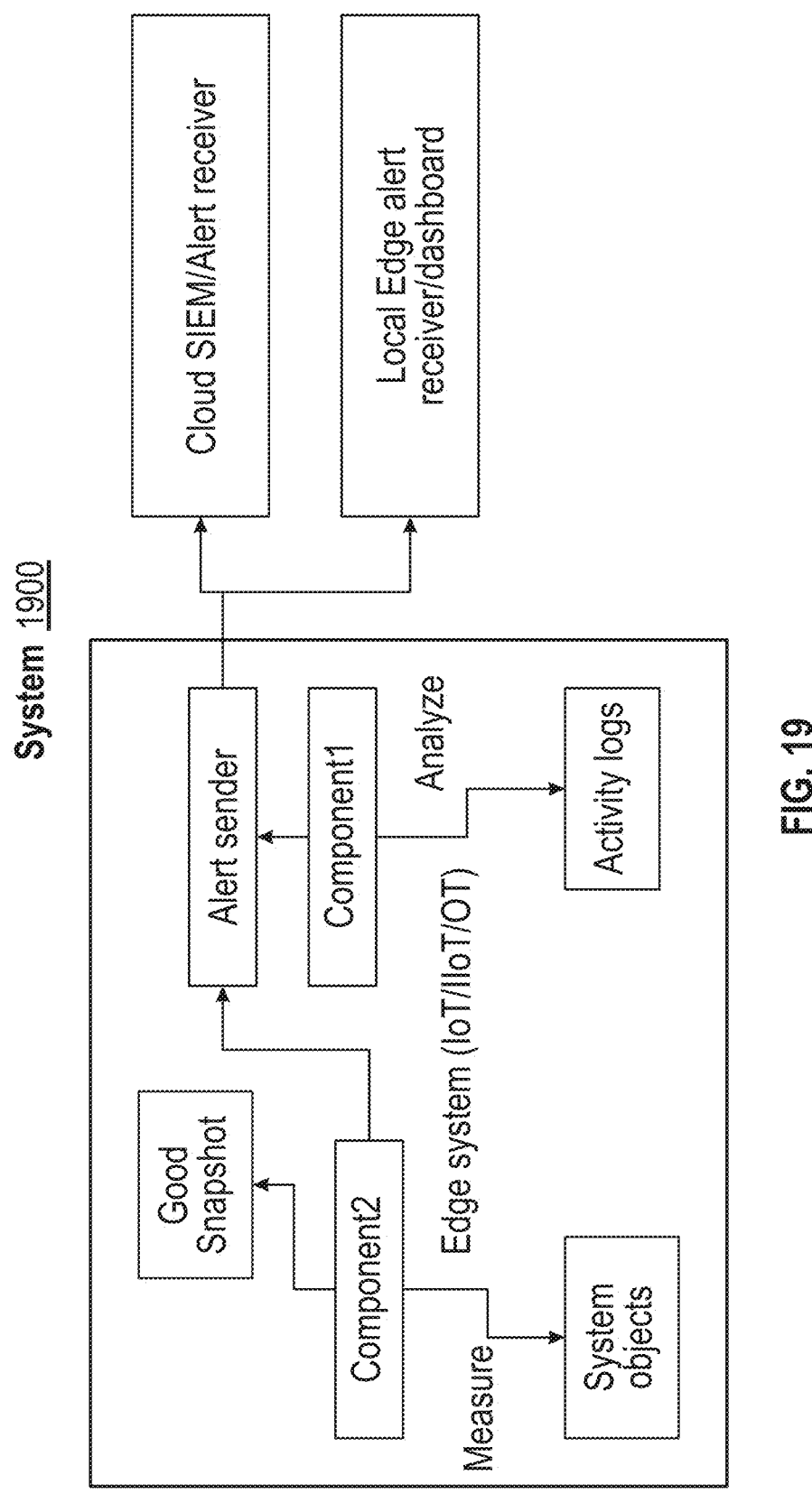
FIG. 19 illustrates an example of a system.

FIG. 19 shows an example of a system 1900 that can provide for snapshots (e.g., thumbprints, activity and/or data signatures, etc.). Such a system may operate at an edge, optionally with or without Internet connectivity. As an example, a system may operate differentially where relationships between two or more devices are known. For example, if one device transmits a control signal to another device, activity logs of both devices may be in the form of thumbprints (e.g., snapshots) where expected relationships can be found to exist or not, the latter of which may indicate a security issue (e.g., and/or an operational issue, etc.).

As explained, various techniques, technologies, etc., can improve cybersecurity at the edge to address challenges with reasonable coverage and work in poor or no connectivity use cases. As an example, a system can address challenges that can span a whole lifecycle of disconnected or poorly connected edge and Industrial IoT (IIoT) systems.

As explained, an edge device can include various software components deployed. Such components may include one of the below or both at the same time: machine learning component that will analyze device activity logs locally; and intrusion detection system, which takes snapshots of the system security posture (e.g., open-source example: AIDE)

As an example, a system can include a receiver of alerts on the cloud, at the edge, or both (e.g., consider a cloud SIEM, a local HMI dashboard, etc.).

As to a ML component, it may take some time (time windows of few hours or few days) to learn normal system behavior. It can then monitor logs for unusual activity and trigger alerts to the cloud or to a local edge receiver. Therefore, an ML component can allow for not sending of each log to the cloud and/or not sending a single log to the cloud.

With a mature ML model, a component can generate meaningful alerts that do not demand advanced human cybersecurity analysis where a local edge receiver console (e.g., offline use case) can be sufficient or, optionally the cloud (e.g. BGAN use case) where sufficient bandwidth, availability, time, etc., exists.

As an example, a system can send alerts to the edge receiver/cloud or can add activity logs on top of that. Under an assumption of BGAN use (e.g., expensive, <=64 kbps link) logs may still be too big and too expensive to send such that transmission thereof may be optional. Such a challenge can be a reason for developing a high maturity ML model, to increase accuracy of alerts to the maximum and reduce false positives. However due to the nature of ML there may be some security events and therefore alerts missed (e.g., less than 100% accuracy). As explained, by including another component (e.g., a snapshot component), accuracy can be increased where a ML model may not be mature and even where a ML model may be mature to improve the results.

As explained, components may be installed together or one of them may be utilized, depending on the deployment. Some devices may have some performance constraints, periodic and/or continuous, to run ML model(s). As an example, a ML model may operate on stored data of a device when the device is in a low demand or no demand state. In such an example, computational resources of the device may be more effectively utilized. For example, consider a control device that may have to make control decisions responsive to periodic data. In a no data window, the control device may utilize its computational resources to operation one or more ML models (e.g., trained, for training, etc.).

As an example, a snapshot component can act akin to AIDE. Advanced Intrusion Detection Environment (AIDE) is a utility that creates a database of files on the system, and then uses that database to ensure file integrity and detect system intrusions. For example, consider an approach that measures selected system objects (e.g., binaries, configuration files, directories, etc.) and creates a "good known status" snapshot. Measurement can be via use of one of a currently considered secure hash function. A snapshot may be stored in a secure location in the device or on external device. In such an example, a service can periodically check a current system objects' state and compares to the "good snapshot". As an example, such an approach may operate according to a schedule and/or according to occurrence of one or more events, etc.

Security and accuracy of a check can depend on how secure a "good snapshot" is stored. As an example, options can include to store it in a place on the system where the component/service can modify it and nobody else (e.g., consider root/admin) or store it on an external SD/USB/ another disk with write protection, which can be physically disabled when the snapshot has to be updated.

If a current and a good status differ, an alert can be generated. As an example, an alert can point to an exact object and what was done with it (e.g., object removed, content added or removed, file X added, etc.). If configured acceptably, false positive alerts may be minimal. Where a system is actually compromised and one of the objects is altered, an alert can be generated, with high accuracy, as long as "good snapshot" was not altered.

As an example, for system patching, where one of the objects is planned to be altered, a "good snapshot" can be re-measured and stored securely.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, backpropagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange with various other frameworks.

As an example, the TENSORFLOW framework (Google LLC, Mountain View, CA) may be implemented, which is an open-source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, etc., on multiple platforms.

In various instances, an administrator can set one or more limits on a token. For example, consider a one-use token that is immediately destroyed when a user logs out. Or, for example, consider a token that is set to self-destruct at the end of a specified time period. As an example, token-based authentication may be programmed using one or more programming languages. For example, consider JSON as the JAVASCRIPT object notation.

As an example, a token can be of a particular size for passing between two entities, may be generated by one or more devices, and may be controlled, for example, as to what can be accessed, how long permission lasts, what can be performed while logged on, etc.

As an example, a system can include edge devices that include communication circuitry; and one or more security components.

FIG. 20 shows examples of method 2004 and 2008, which may be utilized alone and/or in combination. As shown, the method 2004 can include an execution block 2010 for executing a trained machine learning model on an edge device; and a detection block 2020 that, based at least in part on the executing, can provide for detecting a change in state of the edge device. As shown, the method 2008 can include a reception block 2030 for receiving security codes from a plurality of edge devices without accessing the Internet; a comparison block 2040 for comparing the security codes without accessing the Internet; and a connection block 2050 that, based at least in part on the comparison, can provide for connecting the plurality of edge devices for communication without accessing the Internet.

The method 2000 is shown in FIG. 20 in association with various computer-readable media (CRM) blocks 2011, 2021, 2031, 2041 and 2051. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 2000. As an example, a computer-readable medium (CRM) may be a computer-readable storage medium that is non-transitory and that is not a carrier wave. As an example, one or more of the blocks 2011, 2021, 2031, 2041 and 2051 may be in the form of processor-executable instructions.

As an example, a system can include edge devices that include communication circuitry; and one or more security components. In such an example, the one or more security components can include a security code interface and/or a mobile device application that includes security code sensing circuitry, for example, consider security code sensing circuitry is operatively coupled to a camera where, for example, the mobile device application includes an augmented reality program that operates using images acquired by the camera. As an example, a mobile device application can include a comparison program that compares security codes sensed by a security code sensing circuitry.

As an example, one or more security components can include a machine learning model. For example, consider a trained machine learning model that processes information generated by one or more of the edge devices.

As an example, one or more security components can include a state characterization component where, for example, the state characterization component measures at least one object of an object-based framework of one or more of the edge devices. In such an example, the state characterization component can compare one or more measurements.

As an example, one or more security components can include a state characterization component and a machine learning model. In such an example, the one or more security components can include a security code interface.

As an example, a method can include receiving security codes from a plurality of edge devices without accessing the Internet; comparing the security codes without accessing the Internet; and, based at least in part on the comparing, connecting the plurality of edge devices for communication without accessing the Internet. As an example, in such a method, the receiving and the comparing can be performed via a mobile device.

As an example, a method can include generating an augmented reality graphical user interface that includes a topology graphic with a representation of at least one of the plurality of edge devices.

As an example, a method can include executing a machine learning model to detect a change in state of at least one of a plurality of edge devices. As an example, a method can include comparing object snapshots to detect a change in state of at least one of a plurality of edge devices.

As an example, a method can include executing a trained machine learning model on an edge device; and, based at least in part on the executing, detecting a change in state of the edge device. In such an example, the change in state can correspond to an unacceptable change indicative of a security breach.

As an example, a method can include comparing object snapshots responsive to detecting a change via a machine learning model. For example, consider comparing that detects a mismatch indicative of a security breach.

As an example, a computer program product can include one or more computer-readable storage media that can include processor-executable instructions to instruct a computing system to perform one or more methods and/or one or more portions of a method.

Figure 21:
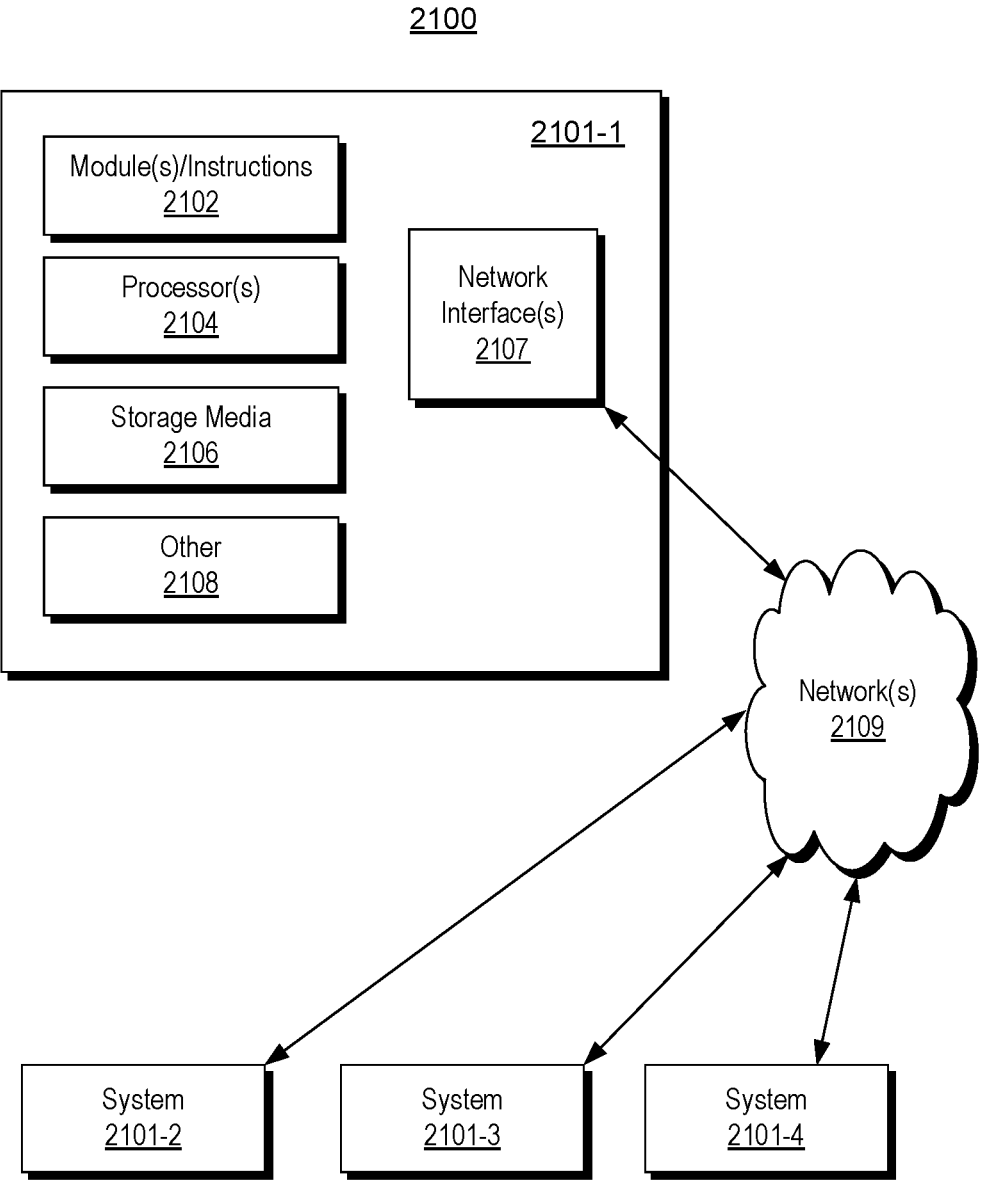
FIG. 21 illustrates examples of computer and network equipment.

In some embodiments, a method or methods may be executed by a computing system. FIG. 21 shows an example of a system 2100 that can include one or more computing systems 2101-1, 2101-2, 2101-3 and 2101-4, which may be operatively coupled via one or more networks 2109, which may include wired and/or wireless networks.

As an example, a system can include an individual computer system or an arrangement of distributed computer systems. In the example of FIG. 21, the computer system 2101-1 can include one or more modules 2102, which may be or include processor-executable instructions, for example, executable to perform various tasks (e.g., receiving information, requesting information, processing information, simulation, outputting information, etc.).

As an example, a module may be executed independently, or in coordination with, one or more processors 2104, which is (or are) operatively coupled to one or more storage media 2106 (e.g., via wire, wirelessly, etc.). As an example, one or more of the one or more processors 2104 can be operatively coupled to at least one of one or more network interface 2107. In such an example, the computer system 2101-1 can transmit and/or receive information, for example, via the one or more networks 2109 (e.g., consider one or more of the Internet, a private network, a cellular network, a satellite network, etc.).

As an example, the computer system 2101-1 may receive from and/or transmit information to one or more other devices, which may be or include, for example, one or more of the computer systems 2101-2, etc. A device may be located in a physical location that differs from that of the computer system 2101-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

FIG. 22 shows components of an example of a computing system 2200 and an example of a networked system 2210 with a network 2220. The system 2200 includes one or more processors 2202, memory and/or storage components 2204, one or more input and/or output devices 2206 and a bus 2208. In an example embodiment, instructions may be stored in one or more computer-readable media (e.g., memory/storage components 2204). Such instructions may be read by one or more processors (e.g., the processor(s) 2202) via a communication bus (e.g., the bus 2208), which may be wired or wireless. The one or more processors may execute such instructions to implement (wholly or in part) one or more attributes (e.g., as part of a method). A user may view output from and interact with a process via an I/O device (e.g., the device 2206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2210. The network system 2210 includes components 2222-1, 2222-2, 2222-3, . . . 2222-N. For example, the components 2222-1 may include the processor(s) 2202 while the component(s) 2222-3 may include memory accessible by the processor(s) 2202. Further, the component(s) 2222-2 may include an I/O device for display and optionally interaction with a method. A network 2220 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A system comprising:

a plurality of edge devices, each edge device of the plurality of edge devices comprising communication circuitry operatively coupled to hydrocarbon extraction equipment at a field site, wherein the plurality of edge devices comprises:

a first edge device comprising a computing node deployed at the field site; and a second edge device comprising at least one of a drilling sensor or a wellsite controller; and one or more security components comprising at least one processor and memory storing instructions that, when executed, cause the system to:

capture a snapshot of an object to create a good snapshot having a good known status, the object including activity logs of the plurality of edge devices, the activity logs having security codes;

store the good snapshot in a location comprising at least one of the first edge device, the second edge device, or an external device;

capture current activity logs including current security codes from one or more edge devices of the plurality of edge devices over a local network at the field site to create a current snapshot;

compare, locally at the field site over the local network, the current snapshot to the good snapshot, the comparing including comparing the security codes to the current security codes;

based on the comparing the security codes, selectively establish authenticated communication connections among the plurality of edge devices over the local network to enable monitoring of drilling parameters of the hydrocarbon extraction equipment via the plurality of edge devices; and based on the comparing the security codes, and in response to an edge device of the plurality of edge devices having a status differing from the good known status, generate an alert indicative of the status.

2. The system of claim 1, wherein the one or more security components comprise a security code interface.

3. The system of claim 1, wherein the one or more security components comprise a mobile device that comprises security code sensing circuitry.

4. The system of claim 3, wherein the security code sensing circuitry is operatively coupled to a camera.

5. The system of claim 4, wherein the mobile device comprises an augmented reality program that operates using images acquired by the camera.

6. The system of claim 1, wherein the one or more security components comprise a machine learning model.

7. The system of claim 6, wherein the machine learning model comprises a trained machine learning model that processes information generated by one or more edge devices of the plurality of edge devices.

8. The system of claim 1, wherein the one or more security components comprise a state characterization component.

9. The system of claim 1, wherein the one or more security components comprise a state characterization component and a machine learning model.

10. The system of claim 9, wherein the one or more security components comprise a security code interface.

11. The system of claim 1, wherein the alert is configured to indicate an action taken to the object in response to the status differing from the good known status, the action comprising at least one of removing the object, adding content to the object, removing content from the object, or adding a file to the object.

12. A method comprising:

capturing a snapshot of an object to create a good snapshot having a good known status, the object including activity logs of a plurality of edge devices, the activity logs having security codes and the plurality of edge devices comprising:

a first edge device comprising a computing node deployed at a field site; and a second edge device comprising at least one of a drilling sensor or a wellsite controller;

storing the good snapshot in a location comprising at least one of the first edge device, the second edge device, or an external device;

capturing current activity logs including current security codes from one or more edge devices of the plurality of edge devices over a local network at the field site to create a current snapshot;

comparing, locally at the field site over the local network, the current snapshot to the good snapshot, the comparing including comparing the security codes to the current security codes;

based on the comparing the security codes, selectively establishing authenticated communication connections among the plurality of edge devices over the local network to enable monitoring of drilling parameters of hydrocarbon extraction equipment via the plurality of edge devices; and based on the comparing the security codes, and in response to an edge device of the plurality of edge devices having a status differing from the good known status, generating an alert indicative of the status.

13. A non-transitory computer readable medium storing instructions that, when executed by a processor, causes the processor to:

capture a snapshot of an object to create a good snapshot having a good known status, the object including activity logs of a plurality of edge devices, the activity logs having security codes and the plurality of edge devices comprising:

a first edge device comprising a computing node deployed at a field site; and a second edge device comprising at least one of a drilling sensor or a wellsite controller;

store the good snapshot in a location comprising at least one of the first edge device, the second edge device, or an external device;

capture current activity logs including current security codes from one or more edge devices of the plurality of edge devices over a local network at the field site to create a current snapshot;

compare, locally at the field site over the local network, the current snapshot to the good snapshot, the comparing including comparing the security codes to the current security codes;

based on the comparing the security codes, selectively establishing authenticated communication connections among the plurality of edge devices over the local network to enable monitoring of drilling parameters of hydrocarbon extraction equipment via the plurality of edge devices; and based on the comparing the security codes, and in response to an edge device of the plurality of edge devices having a status differing from the good known status, generate an alert indicative of the status;

wherein the alert is configured to indicate an action taken to the object in response to the status differing from the good known status, the action comprising at least one of removing the object, adding content to the object, removing content from the object, or adding a file to the object.

* * * * *